United States Patent
Singh et al.

(10) Patent No.: US 11,354,503 B2
(45) Date of Patent: Jun. 7, 2022

(54) METHOD FOR AUTOMATICALLY PROVIDING GESTURE-BASED AUTO-COMPLETE SUGGESTIONS AND ELECTRONIC DEVICE THEREOF

(71) Applicant: Samsung Electronics Co., Ltd., Suwon-si (KR)

(72) Inventors: Vikrant Singh, Bangalore (IN); Ankit Vijay, Bangalore (IN); Pragya Paramita Sahu, Bangalore (IN); Shankar Mosur Venkatesan, Bangalore (IN); Viswanath Veera, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 16/047,537

(22) Filed: Jul. 27, 2018

(65) Prior Publication Data

US 2019/0034406 A1 Jan. 31, 2019

(30) Foreign Application Priority Data

Jul. 27, 2017 (IN) .............................. 201741026780
Jul. 6, 2018 (IN) .............................. 201741026780

(51) Int. Cl.
*G06F 17/00* (2019.01)
*G06F 40/274* (2020.01)
(Continued)

(52) U.S. Cl.
CPC .......... *G06F 40/274* (2020.01); *G06F 3/0233* (2013.01); *G06F 3/0237* (2013.01);
(Continued)

(58) Field of Classification Search
CPC .... G06F 3/0237; G06F 3/0481; G06F 17/276; G06F 40/274; G06F 3/0233
(Continued)

(56) References Cited

U.S. PATENT DOCUMENTS 5,835,635 A   11/1998  Nozaki et al.
6,970,599 B2 *  11/2005  Longe ..................... G06F 3/018
                                                                382/185
(Continued)

FOREIGN PATENT DOCUMENTS

EP      2960761 A1     12/2015
KR   20070114329 A     12/2007
KR   20150001095 A      1/2015

OTHER PUBLICATIONS

Choi, Generation of Handwritten Characters with Bayesian network based on On-line Handwriting Recognizers, Conference on Document Analysis and Recognition, 2003 IEEE (Year: 2003).*

(Continued)

*Primary Examiner* — Stephen S Hong
*Assistant Examiner* — Matthew J Ludwig
(74) *Attorney, Agent, or Firm* — Jefferson IP Law, LLP

(57) ABSTRACT

A method for providing gesture-based complete suggestions is provided. The method includes detecting at least one gesture performed by a user to complete an incomplete text provided by the user in an electronic device. Further, the method includes determining at least one remaining text to complete the incomplete text based on the at least one gesture and the incomplete text. Further, the method includes forming at least one complete text by adding the at least one remaining text to the incomplete text. Further, the method includes displaying the at least one complete text.

18 Claims, 34 Drawing Sheets

(51) Int. Cl.
*G06F 3/023* (2006.01)
*G06F 3/0481* (2022.01)
*G06F 3/04883* (2022.01)
*G06F 40/247* (2020.01)

(52) U.S. Cl.
CPC ........ *G06F 3/0481* (2013.01); *G06F 3/04883* (2013.01); *G06F 40/247* (2020.01)

(58) Field of Classification Search
USPC .......................... 715/255, 256, 257, 261, 268
See application file for complete search history.

(56) References Cited

U.S. PATENT DOCUMENTS

| | | | | |
|---|---|---|---|---|
| 7,227,993 | B2* | 6/2007 | Xu | G06F 3/04883 382/179 |
| 7,715,629 | B2* | 5/2010 | Abdulkader | G06K 9/6255 382/186 |
| 7,996,589 | B2* | 8/2011 | Schultz | G06F 3/04883 710/73 |
| 8,701,032 | B1 | 4/2014 | Zhai et al. | |
| 8,996,995 | B2 | 3/2015 | Ramachandra | |
| 9,400,782 | B2 | 7/2016 | Longe et al. | |
| 9,626,354 | B2* | 4/2017 | Feng | G06F 40/279 |
| 9,658,770 | B2 | 5/2017 | Choi | |
| 10,228,846 | B2* | 3/2019 | Dixon | G06F 3/0481 |
| 10,346,035 | B2* | 7/2019 | Xia | G06V 30/387 |
| 10,599,779 | B2* | 3/2020 | Wei | G06F 40/40 |
| 10,671,182 | B2* | 6/2020 | Aley | G06F 3/0482 |
| 2006/0109262 | A1* | 5/2006 | Yeh | G06F 3/03545 345/179 |
| 2006/0179189 | A1* | 8/2006 | Lin | G06F 40/109 710/67 |
| 2008/0120540 | A1 | 5/2008 | Borgaonkar et al. | |
| 2008/0294982 | A1* | 11/2008 | Leung | G06F 40/274 715/261 |
| 2013/0204891 | A1 | 8/2013 | Maw | |
| 2014/0104177 | A1* | 4/2014 | Ouyang | G06F 3/04883 345/168 |
| 2014/0108992 | A1* | 4/2014 | Bi | G06F 3/04883 715/773 |
| 2014/0317547 | A1* | 10/2014 | Bi | G06F 3/04883 715/773 |
| 2014/0344662 | A1* | 11/2014 | Isabel | G06F 3/04883 715/230 |
| 2015/0121285 | A1* | 4/2015 | Eleftheriou | G06F 3/0412 715/773 |
| 2015/0169975 | A1* | 6/2015 | Kienzle | G06V 30/347 382/189 |
| 2016/0019201 | A1* | 1/2016 | Qian | G06F 40/171 704/9 |
| 2017/0068416 | A1* | 3/2017 | Li | G06F 3/04812 |
| 2017/0255278 | A1* | 9/2017 | Aley | G06F 3/0482 |
| 2017/0270357 | A1* | 9/2017 | Winebrand | G06K 9/00436 |

OTHER PUBLICATIONS

International Search Report issue date in International Application No. PCT/KR2018/008554.
Indian Office Action dated Dec. 21, 2020; Indian Appln. No. 201741026780.

* cited by examiner

METHOD FOR AUTOMATICALLY PROVIDING GESTURE-BASED AUTO-COMPLETE SUGGESTIONS AND ELECTRONIC DEVICE THEREOF

CROSS-REFERENCE TO RELATED APPLICATION(S)

This Applications is based on and claims priority under 35 U.S.C. § 119(a) of an Indian patent application number 201741026780, filed on Jul. 27, 2017, and under 35 U.S.C. § 119(a) of an Indian patent application number 201741026780, filed on Jul. 6, 2018, the disclosure of each of which is incorporated by reference herein in its entirely.

BACKGROUND

1. Field

The disclosure relates to a method and a system for performing gesture-based auto-completion of handwriting. More particularly, the disclosure relates to a method for detecting at least one auto-complete gesture performed by a user to auto-complete an incomplete text provided by a user in an electronic device.

2. Description of Related Art

There have been various advancements in input methods, which are trying to reduce an effort while typing in an electronic device (e.g., a smart phone, a smart watch, or the like). A 3×4 keypad is used in the electronic device, according to the related art. The 3×4 keypad is replaced with a QWERTY based keyboard in a touch based electronic device. Later, the input methods like continuous input, swipe to text, swipe, glide etc. are all introduced to ease the effort while typing and to type quickly especially with the electronic device. Various advancements in a prediction engine also has been in place for providing better typing experience. In an example, the prediction engine can predict a longer context and provide contextual prediction. But, handwriting (HWR) recognition in pen based electronic devices still does not have any of the advancements that have made typing easy.

In an example, the existing methods can be used to provide auto-completion in HWR mode solutions only comprising of a pop-up with a long list of context dependent possible words, which the user has to scroll through to find the required word. The current HWR recognition systems do not allow the users to prioritize the completion in any other specific intelligent way using the least user effort. The only way to input long words correctly is to write the complete word.

Thus, a need exists for a method for detecting at least one auto-complete gesture performed by a user to auto-complete an incomplete text provided by a user in an electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for performing gesture-based auto-completion of handwriting.

Another aspect of the disclosure herein is to detect at least one auto-complete gesture performed by a user to auto-complete an incomplete text provided by a user in an electronic device.

Additional aspects will be set forth in part in the description which follows and, in part, will be apparent from the description, or may be learned by practice of the presented embodiments.

Another aspect of the disclosure herein is to determine at least one of a type of the auto-complete gesture and a length of the auto-complete gesture.

Another aspect of the disclosure herein is to dynamically predict at least one remaining text to complete the incomplete text based on at least one auto-complete gesture and the incomplete text.

Another aspect of the disclosure herein is to automatically form at least one complete text by adding the at least one remaining text to the incomplete text.

Another aspect of the disclosure herein is to dynamically map the length of at least one auto-complete gesture to the number of characters to be predicted in at least one remaining text.

Another aspect of the disclosure herein is to detect at least one auto-complete gesture performed to mark a text from at least one complete text.

Another aspect of the disclosure herein is to predict at least one alternate text corresponding to the marked text based on the type of at least one auto-complete gesture.

Accordingly, the embodiments herein disclose a method for automatically providing gesture-based auto-complete suggestions. The method includes detecting at least one auto-complete gesture performed by a user to auto-complete an incomplete text provided by the user in an electronic device. Further, the method includes dynamically predicting at least one remaining text to complete the incomplete text based on the at least one auto-complete gesture and the incomplete text. Further, the method includes automatically forming at least one complete text by adding at least one remaining text to the incomplete text. Further, the method includes displaying at least one complete text.

In an embodiment of the disclosure, dynamically predicting at least one remaining text to complete the incomplete text based on at least one auto-complete gesture and the incomplete text includes determining at least one of a type of the auto-complete gesture and a length of an auto-complete gesture, scanning the incomplete text entered by the user to detect at least one of a number of characters entered by the user in the incomplete text and a limiter character entered by the user in at least one portion of the incomplete text, and dynamically predicting the at least one remaining text based on at least one of the type of the auto-complete gesture, the length of the auto-complete gesture, and at least one of the number of characters entered by the user in the incomplete text and the limiter character entered by the user in the at least one portion of the incomplete text.

In an embodiment of the disclosure, the length of at least one auto-complete gesture is dynamically mapped to the number of characters to be predicted in the at least one remaining text.

In an embodiment of the disclosure, the type of at least one auto-complete gesture is used to identify a type of remaining text needs to be predicted, where the type of remaining text includes one of a tense form of the remaining text and a verb form of the remaining text.

In an embodiment of the disclosure, the number of characters entered by the user in the incomplete text is used to identify a number of characters in the at least one remaining text.

In an embodiment of the disclosure, the limiter character entered by the user in the at least one of the incomplete text indicates a sequence of one or more characters used to specify a boundary between portions in the at least one remaining text to be predicted.

In an embodiment of the disclosure, the incomplete text includes at least one of a prefix, a suffix, and a limiter character.

In an embodiment of the disclosure, the at least one complete text having a same number of characters are grouped together while displaying on the electronic device.

In an embodiment of the disclosure, the incomplete text is provided over air, absent of the user touching a display of the electronic device.

In an embodiment of the disclosure, the at least one auto-complete gesture is provided over air, absent of the user touching a display of the electronic device.

In accordance with an aspect of the disclosure, a method for providing gesture-based auto-complete suggestions in an electronic device is provided. The method includes detecting at least one auto-complete gesture performed to mark a text from the at least one complete text, detecting a type of the at least one auto-complete gesture, predicting an at least one alternate text corresponding to the marked text based on the type of at least one auto-complete gesture, and displaying the at least one alternate text.

In an embodiment of the disclosure, the method further includes automatically replacing the marked text with the alternate text.

In an embodiment of the disclosure, the alternate text is one of a synonym of the marked text, antonym of the marked text and homonym of the marked text.

Accordingly, the embodiments herein disclose a method for automatically providing gesture-based auto-complete suggestions. The method includes detecting an at least one auto-complete gesture performed to mark a text. Further, the method includes detecting a type of the at least one auto-complete gesture. Further, the method includes predicting an at least one alternate text corresponding to the marked text based on the type of at least one auto-complete gesture. Further, the method includes displaying the at least one alternate text.

Accordingly, the embodiments herein disclose a method for automatically providing gesture-based auto-complete suggestions. The method includes obtaining a text. Further, the method includes detecting at least one auto-complete gesture. Further, the method includes dynamically predicting at least one of a remaining text and an alternate text based on the at least one auto-complete gesture and the text. Further, the method includes causing to display at least one a complete text and the alternate text.

In an embodiment of the disclosure, the alternate text is displayed by determining that the text is a complete text, detecting the at least one auto-complete gesture performed to mark a text on the complete text, and dynamically predicting the alternate text corresponding to the marked text based on the at least one auto-complete gesture.

In an embodiment of the disclosure, the complete text is displayed by determining that the text is an incomplete text, detecting the at least one auto-complete gesture performed by a user to auto-complete the incomplete text provided by the user in the electronic device, and dynamically predicting at least one of the remaining text, and automatically forming the complete text by adding the at least one remaining text to the incomplete text.

In accordance with another aspect of the disclosure, the electronic device for automatically providing gesture-based auto-complete suggestions is provided. The electronic device includes a HWR engine coupled to a memory and a processor. The HWR engine is configured to detect at least one auto-complete gesture performed by a user to auto-complete an incomplete text provided by the user in the electronic device. The HWR engine is configured to dynamically predict at least one remaining text to complete the incomplete text based on the at least one auto-complete gesture and the incomplete text. The HWR engine is configured to automatically form at least one complete text by adding the at least one remaining text to the incomplete text. The HWR engine is configured to display the at least one complete text.

Accordingly, the embodiments herein disclose an electronic device for automatically providing gesture-based auto-complete suggestions. The electronic device includes a HWR engine coupled to a memory and a processor. The HWR engine is configured to detect an at least one auto-complete gesture performed to mark a text. The HWR engine is configured to detect a type of the at least one auto-complete gesture. The HWR engine is configured to predict an at least one alternate text corresponding to the marked text based on the type of at least one auto-complete gesture. The HWR engine is configured to display the at least one alternate text.

Accordingly, the embodiments herein disclose an electronic device for automatically providing gesture-based auto-complete suggestions. The electronic device includes a HWR engine coupled to a memory and a processor. The HWR engine is configured to obtain a text. Further, the HWR engine is configured to detect at least one auto-complete gesture. Further, the HWR engine is configured to dynamically predict at least one of a remaining text and an alternate text based on the at least one auto-complete gesture and the text. Further, the HWR engine is configured to display at least one a complete text and the alternate text.

Accordingly, the embodiments herein disclose a text auto-completion method for a stylus-based device. The method includes recognizing at least one character input provided by a user. Further, the method includes detecting that at least one auto-complete gesture is provided by the user. Further, the method includes recognizing at least one of length and duration of the at least one auto-complete gesture. Furthermore, the method includes suggesting at least one word in response to recognizing the at least one of length and duration of the at least one auto-complete gesture. The at least one suggested word results in completion of the at least one character input.

Accordingly, the embodiments herein disclose a stylus-based device for text auto-completion. The stylus-based device includes a HWR engine coupled to a memory and a processor. The HWR engine is configured to recognize at least one character input provided by a user. Further, the HWR engine is configured to detect that at least one auto-complete gesture is provided by the user. Further, the HWR engine is configured to recognize at least one of length and duration of the at least one auto-complete gesture. Further, the HWR engine is configured to suggest at least one word in response to recognizing the at least one of length and duration of the at least one auto-complete gesture. The at least one suggested word results in completion of the at least one character input.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The above information is presented as background information only to assist with an understanding of the disclosure. No determination has been made, and no assertion is made, as to whether any of the above might be applicable as prior art with regard to the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DESCRIPTION

Figure 1:
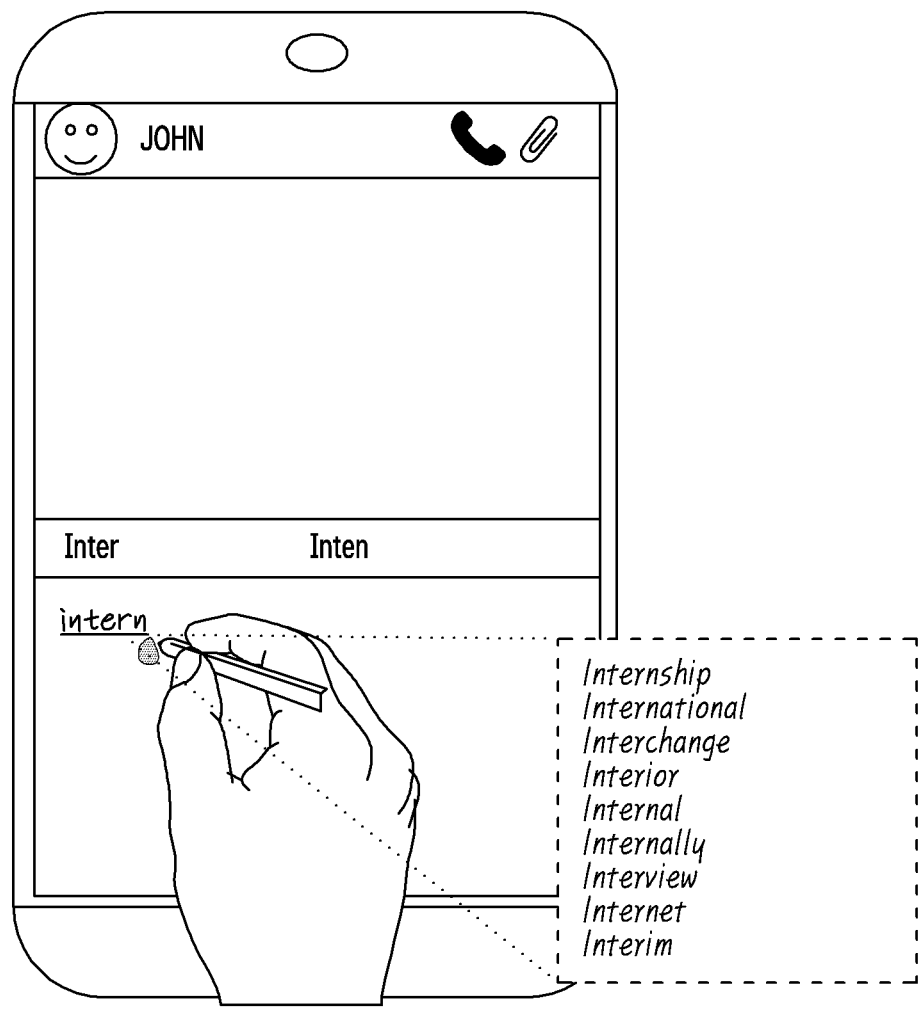
FIG. 1 illustrates auto-completion words being displayed, on an electronic device, by predicting a list of context dependent possible words according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Similarly, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for automatically providing gesture-based auto-complete suggestions. The method includes detecting at least one auto-complete gesture performed by a user to auto-complete an incomplete text provided by the user in an electronic device. Further, the method includes dynamically predicting at least one remaining text to complete the incomplete text based on the at least one auto-complete gesture and the incomplete text. Further, the method includes automatically forming at least one complete text by adding at least one remaining text to the incomplete text. Further, the method includes displaying at least one complete text.

Unlike methods and systems, the proposed method can be used to improve the handwriting (HWR) recognition in electronic devices in real time, according to the related art. This results in writing on the electronic device as convenient and natural as writing on a paper. In the proposed methods, the users can now take notes extremely fast, without worrying about completing each word properly. In the proposed methods, the auto-complete gesture makes use of the strokes most user use during fast paced writing. Thus, the users are not required to incorporate any new writing style to use the auto-complete gesture.

Using length of the auto-complete gesture, the method can be used to provide an additional input (e.g., suffix length) to an auto-complete logic while writing on the electronic device. The electronic device utilizes length of the auto-complete gesture to find the number of missing characters and accurately predicts the semi-written word. This results in reducing the search data-base, thus increasing the accuracy and reducing the prediction time.

Referring now to the drawings, and more particularly to FIGS. 2, 3-7, 8A to 8D, 9A and 9B, 10A and 10B, 11A and 11B, 12A and 12B, 13A and 13B, 14A and 14B, 15, 16A and 16B, 17A to 17C, 18A and 18B, 19A and 19B, and 20, where similar reference characters denote corresponding features consistently throughout the figures. The preferred embodiments are shown in the figures.

FIG. 1 illustrates auto-completion words being displayed, on an electronic device, by predicting a list of context dependent possible words, according to the related art.

Referring to FIG. 1, the user enters information in a HWR receiving panel of an electronic device. The HWR receiving panel attempts to recognize the input information and forwards recognition results to an auto complete provider. The auto complete provider is integrated with the HWR receiving panel. The auto complete provider provides auto complete suggestions to the user in response to the recognized information forward to the auto complete provider from the HWR receiving panel. Further, the user selects one of the suggestions through a user input.

Consider, if the user wants to write "Internship" and the user has written an incomplete word (i.e., Inter), then based on the existing methods, the electronic device predicts possible words (e.g., International, Interchange, Interior, Internal, Internally, Interview, Internet, Interim, or the like). Further, the user can select one of the suggestions through the user input.

Figure 2:
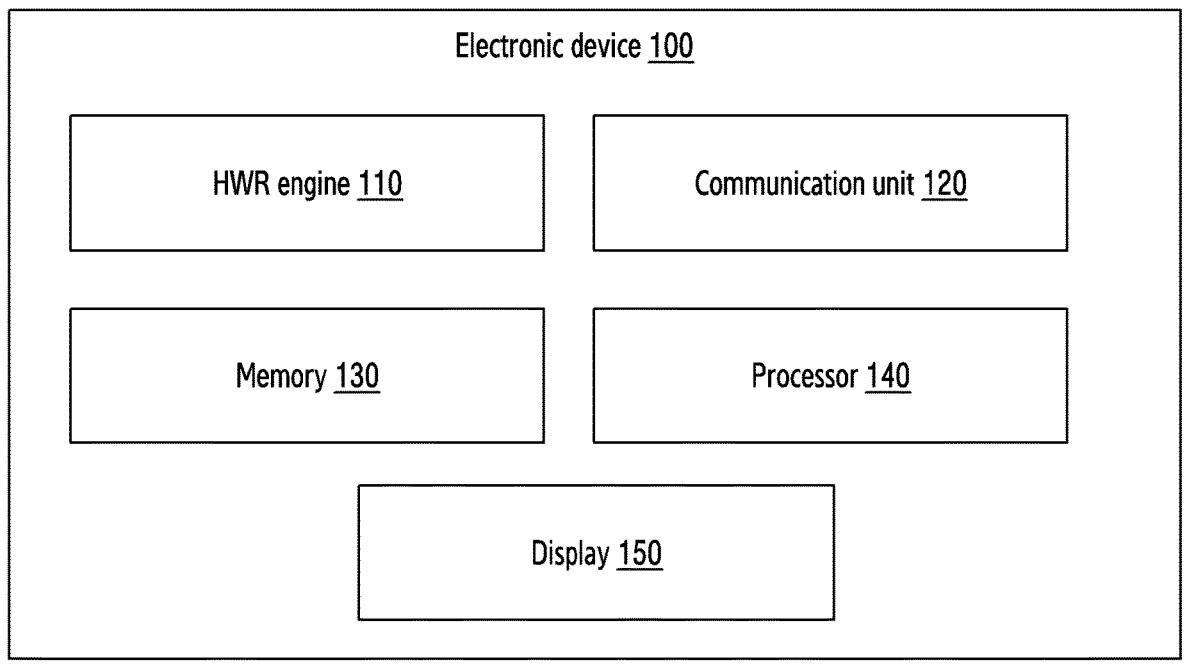
FIG. 2 is a block diagram of an electronic device for automatically providing gesture-based auto-complete suggestions according to various embodiments of the disclosure.

FIG. 2 is a block diagram of an electronic device for automatically providing gesture-based auto-complete suggestions according to various embodiments of the disclosure.

Referring to FIG. 2, an electronic device 100 can be, for example, but not limited to a smart phone, a laptop, a desktop, a stylus-based device, a personal digital assistant (PDA), a mobile Internet device (MID), a media player, a smart televisions (TV), an infotainment system, a smart watch, a gaming platform, a server platform, S-Pen or the like.

In an embodiment of the disclosure, the electronic device 100 includes an HWR engine 110, a communication unit 120, a memory 130, a processor 140, and a display 150.

The HWR engine 110 is configured to detect one or more auto-complete gesture performed by the user to auto-complete an incomplete text provided by the user in the electronic device 100. In an example, the auto-complete gesture can be a straight or wavy horizontal stroke continuing from the incomplete text or a partially written word provided by the user when the user doesn't want to write the full word on the electronic device 100. Further, the user may utilize a writing implement, such as a stylus or a finger to input the incomplete text and the auto-complete gesture. The incomplete text includes at least one of a prefix, a suffix, and a limiter character. The prefix, the suffix, and the limiter character are used to identify the complete text.

Further, the HWR engine 110 is configured to predict one or more remaining text to complete the incomplete text based on the one or more auto-complete gesture and the incomplete text. For example, the HWR engine 110 may dynamically predict the one or more remaining text.

In an embodiment of the disclosure, the HWR engine 110 is configured to dynamically predict one or more remaining text to complete the incomplete text by determining at least one type of the auto-complete gesture and length of the auto-complete gesture, and scanning the incomplete text entered by the user to detect at least one of a number of characters entered by the user in the incomplete text and a limiter character entered by the user in at least one portion of the incomplete text. The type of the auto-complete gesture can be, for example, but not limited to direction of the auto-complete gesture, a pattern of the auto-complete gesture or the like.

Figure 8A:
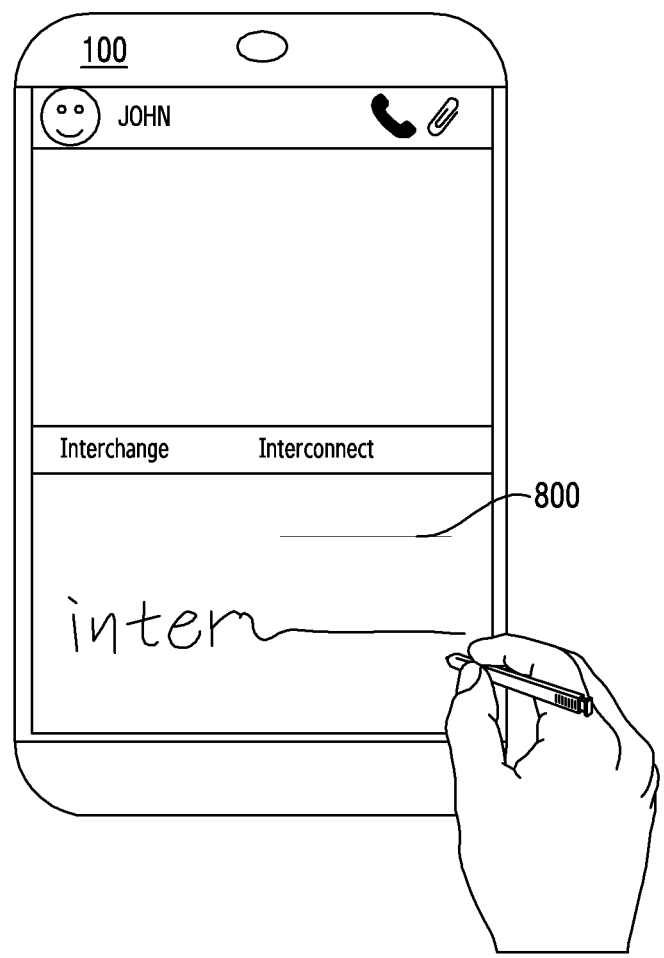
FIGS. 8A, 8B, 8C, and 8D illustrate auto-completion words being displayed on an electronic device based on a length of an auto-complete gesture according to various embodiments of the disclosure.
Figure 8B:
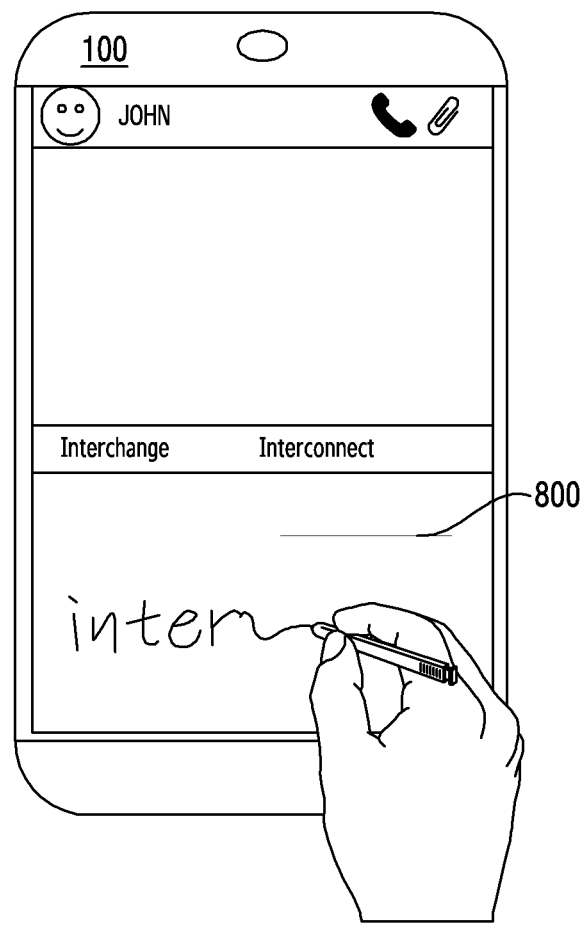

In an embodiment of the disclosure, the length of the at least one auto-complete gesture is dynamically mapped to the number of characters to be predicted in the at least one remaining text (explained in the FIG. 8A and FIG. 8B).

In an embodiment of the disclosure, the length of the at least one auto-complete gesture is dynamically mapped to the number of characters to be predicted in the at least one remaining text based on length of the written characters. The HWR engine 110 detects length of the written characters and then maps the gesture length to the number of characters using the length. Below table 1 illustrates the example for a gesture length mapping:

TABLE 1

| Gesture Length | Mapping | Suggestion word |
|---|---|---|
| | 3-4 | Internet |
| | 5-6 | Internship |
| | 7-8 | International |

In an embodiment of the disclosure, the gesture length mapping is achieved by recognizing the prefix by the HWR engine 110, calculating the x-span of the prefix and divide it by the number of characters in prefix to get the average character width, and calculating the length (x-span) of the gesture and dividing it by the average character width to get suffix length (number of missing characters).

In an embodiment of the disclosure, the type of at least one auto-complete gesture is used to identify a type of remaining text that needs to be predicted, wherein the type of remaining text includes one of a tense form of the remaining text and a verb form of the remaining text (as shown in the FIGS. 10A, 10B, 11A, and 11B). Further, those skilled in the art will appreciate that the proposed methods can be predicted with any other type of word by defining different gestures.

In an embodiment of the disclosure, the number of characters entered by the user in the incomplete text is used to identify a number of characters in at least one remaining text.

In an embodiment of the disclosure, the limiter character entered by the user in at least one of the incomplete text indicates a sequence of one or more characters used to specify a boundary between portions in at least one remaining text to be predicted.

Further, the HWR engine 110 is configured to automatically form the one or more complete text by adding one or more remaining text to the incomplete text. After forming one or more complete text, the display 150 displays one or more complete text. The display 150 with a touch screen, such as a liquid crystal display (LCD), a light-emitting diode (LED), and so on. In an embodiment of the disclosure, the user input is received on a touch pad, a virtual keypad or the like.

In an embodiment of the disclosure, the complete text is formed by using the incomplete text, the auto-complete gesture and user writing behavior.

In an embodiment of the disclosure, at least one complete text having same number of characters are grouped together while displaying on the electronic device 100.

Figure 13A:
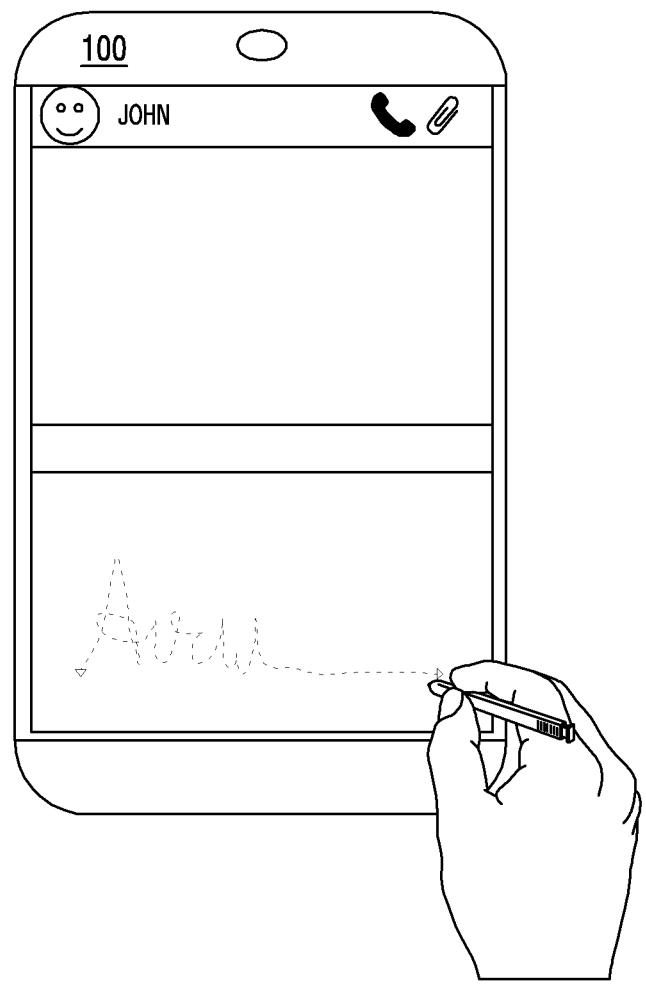
FIGS. 13A and 13B illustrate auto-completion word being displayed on an electronic device, where an auto-complete gesture and an incomplete text are provided over air, according to various embodiments of the disclosure.
Figure 13B:
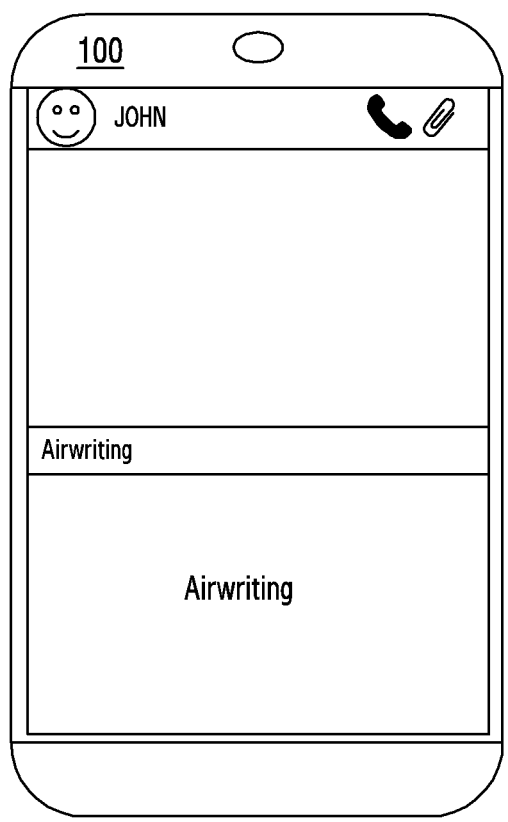

In an embodiment of the disclosure, the incomplete text is provided over air and at least one auto-complete gesture is provided over air as shown in FIG. 13A and FIG. 13B.

In another embodiment of the disclosure, the HWR engine 110 is configured to detect one or more auto-complete gestures performed to mark a text from one or more complete text. Further, the HWR engine 110 is configured to detect a type of at least one auto-complete gesture and predict at least one alternate text corresponding to the marked text based on the type of at least one auto-complete gesture. After predicting at least one alternate text corresponding to the marked text, the display 150 displays at least one alternate text (explained in the FIG. 12A and FIG. 12B).

In an embodiment of the disclosure, at least one alternate text corresponding to the marked text is predicted by automatically replacing the marked text with the alternate text. The alternate text can be a synonym of the marked text, an antonym of the marked text and homonym of any other word related to the marked text. Further, those skilled in the art will appreciate that the proposed methods can be predicted with any other type of alternate text based on the marked text.

Further, the user can define the auto-complete gesture to represent/denote specific operations that have to be carried out on the word. In an example, a specific auto-complete gesture of underlining the word could denote changing the font of the word to "bold". In an embodiment of the disclosure, the auto-complete gesture is provided in between the word. In an embodiment of the disclosure, the auto-complete gesture is provided in between the sentence.

In an embodiment of the disclosure, the auto-complete gesture provides a thesaurus support to the written words. In an embodiment of the disclosure, the auto-complete gesture manipulates and changes the tense of the written verb.

In the proposed methods, the electronic device 100 enables a tap-and-click to obtain the optimal length for the auto-complete gesture, instead of drawing the complete gesture.

Figure 9A:
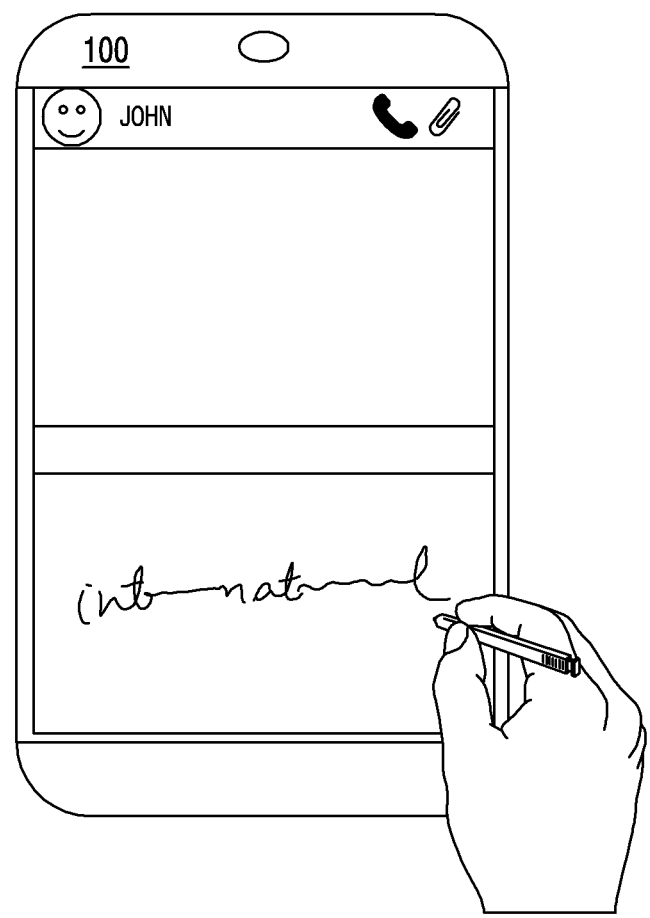
FIGS. 9A and 9B illustrate auto-completion words being displayed on an electronic device, when a user misses certain characters within a word while writing the word according to various embodiments of the disclosure.
Figure 9B:
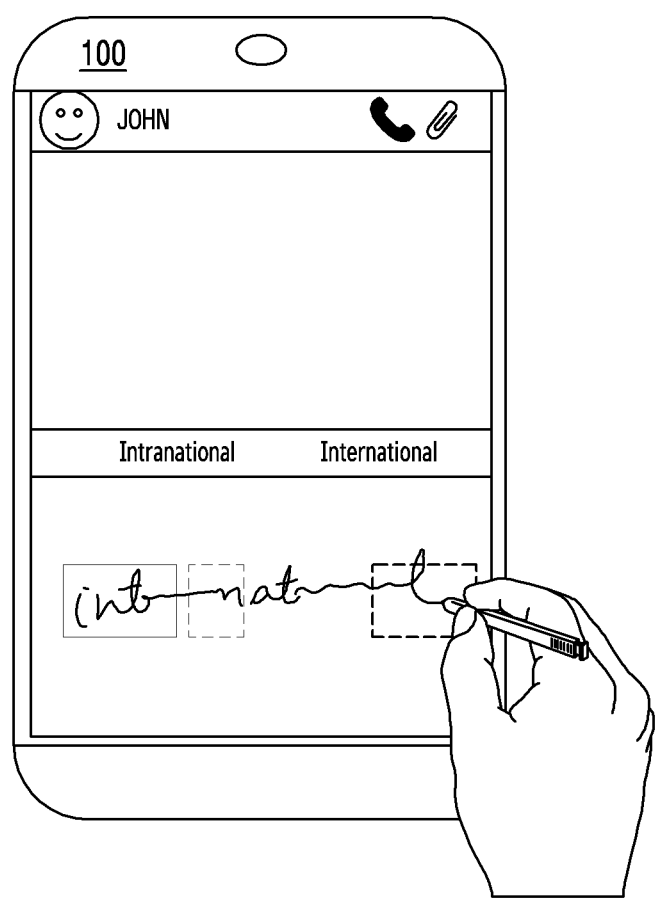

In an embodiment of the disclosure, when the user missed certain characters while writing the complete text, the available characters and their relative position is used to find the most suitable word from a dictionary (explained in the FIG. 9A and FIG. 9B).

In an embodiment of the disclosure, a bidirectional long short term memory (LSTM) is used to recognize the HWR input. In an embodiment of the disclosure, the gesture can be recognized in either of the following ways:

a. The auto-complete gesture and its length can be separately recognized during preprocessing, and b. A unit autocomplete gesture can be trained on the HWR Engine 110 (LSTM based) as a separate unique encoding. The HWR engine 110 would thus, not only recognize the appearance of the gesture, but also measure the gesture length.

The HWR engine 110 trains the LSTM to recognize both the handwritten input as well as the auto-complete gesture, them being of the same modality.

In an embodiment of the disclosure, the complete text is obtained by receiving a recognized prefix and suffix length from the HWR engine 110, finding the possible corresponding paths in a tree data structure, and ranking the words found using a language model (e.g., n-gram language model or the like). The tree data structure is used to store and search a dynamic set or associative array where the keys are usually characters.

In addition, the HWR engine 110 is configured to handle high variability in individual writing habits (e.g., variability in speed, tempo, stroke-order, stroke-direction, stroke-continuity, etc.) without explicitly embedding distinguishing features of the different variations (e.g., variations in speed, tempo, stroke-order, stroke-direction, stroke-continuity, etc.) in the electronic device 100, thereby reducing the overall complexity of the HWR engine 110.

Further, the processor 140 is configured to execute instructions stored in the memory 130 and to perform various processes. The communication unit 120 is configured for communicating internally between internal hardware components and with external devices via one or more networks. The communication unit 120 is configured for communicating with the HWR engine 110 to automatically provide the gesture-based auto-complete suggestions in the electronic device 100.

The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in random access memory (RAM) or cache).

Although the FIG. 2 shows various hardware components of the electronic device 100 but it is to be understood that other embodiments are not limited thereon. In other embodiments of the disclosure, the electronic device 100 may include less or more number of components. Further, the labels or names of the components are used only for illustrative purpose and does not limit the scope of the disclosure. One or more components can be combined together to perform same or substantially similar function to automatically provide the gesture-based auto-complete suggestions in the electronic device 100.

Figure 3:
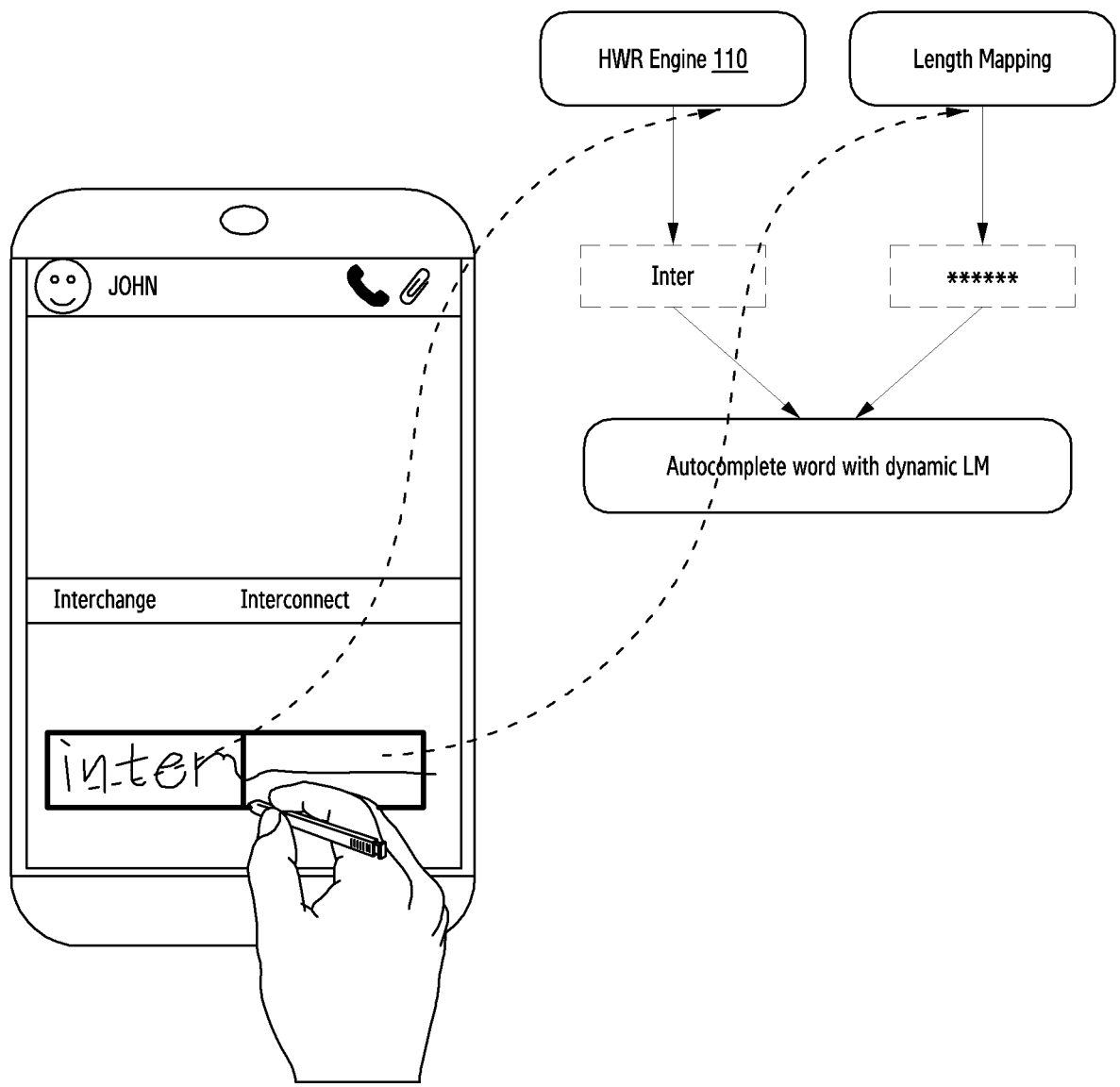
FIG. 3 illustrates auto-completion words being displayed on an electronic device by dynamically predicting one or more remaining text to complete an incomplete text based on one or more auto-complete gesture and an incomplete text according to various embodiments of the disclosure.

FIG. 3 illustrates auto-completion words being displayed on an electronic device by dynamically predicting one or more remaining text to complete an incomplete text based on one or more auto-complete gesture and an incomplete text, according to various embodiments of the disclosure.

Referring to FIG. 3, the auto-completion words are displayed on the electronic device 100 by dynamically predicting one or more remaining text to complete an incomplete text based on one or more auto-complete gesture and the incomplete text. In an example, the user provides the incomplete input (i.e., inter) on the display 150. The input is recognized in real time by the HWR engine 110. Further, based on the input of the auto-complete gesture followed by the incomplete input, based on the proposed methods, the partially written text and the auto-complete gesture are recognized and processed independently. The partially written text feds into the HWR engine 110 to be recognized. The gesture length is dynamically mapped to number of characters depending upon the written text. Based on the recognized prefix text and the mapped suffix length, the HWR engine 110 predicts the complete text (e.g., interconnect, interchange, or the like).

Figure 4:
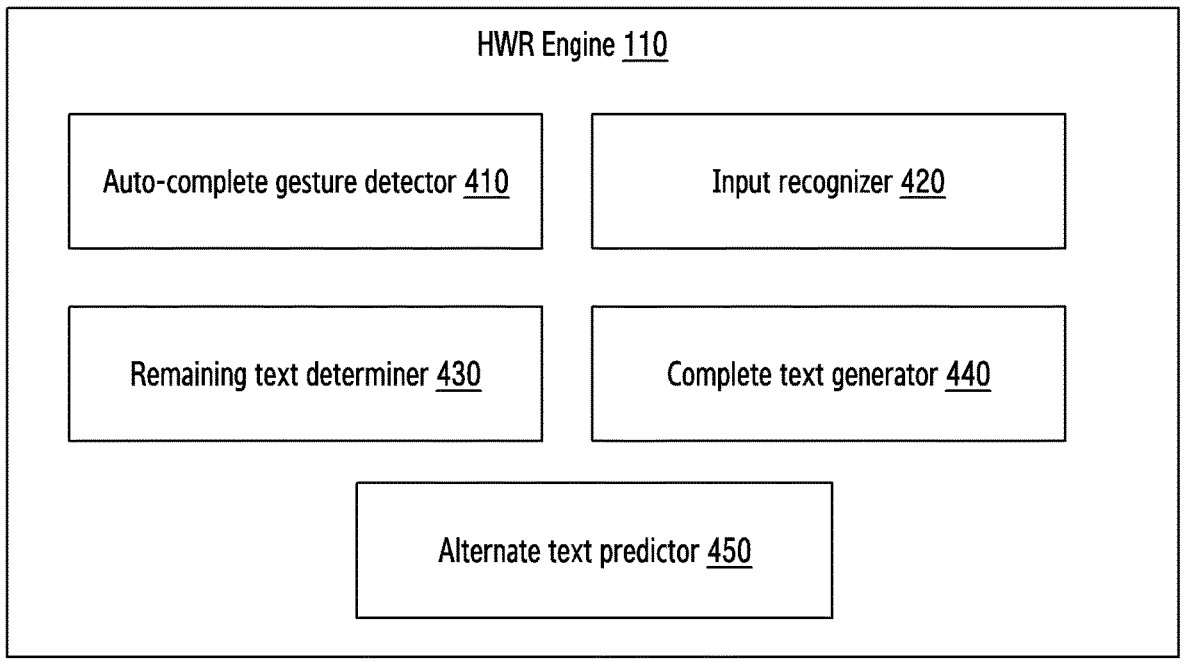
FIG. 4 is a block diagram of a handwriting (HWR) engine according to various embodiments of the disclosure.

FIG. 4 is a block diagram of an HWR engine according to various embodiments of the disclosure.

Referring to FIG. 4, the HWR engine 110 includes an auto-complete gesture detector 410, an input recognizer 420, a remaining text determiner 430, a complete text generator 440, and an alternate text predictor 450.

The auto-complete gesture detector 410 is configured to detect one or more auto-complete gesture performed by the user to auto-complete the incomplete text provided by the user in the electronic device 100. After detecting the one or more auto-complete gesture performed by the user to auto-complete the incomplete text provided by the user in the electronic device 100, the remaining text determiner 430 is configured to dynamically predict one or more remaining text to complete the incomplete text based on the one or more auto-complete gesture and the incomplete text.

In an embodiment of the disclosure, remaining text determiner 430 is configured to dynamically predict the one or more remaining text to complete the incomplete text by determining at least one of the type of the auto-complete gesture and the length of the auto-complete gesture, and scanning the incomplete text entered by the user to detect at least one of the number of characters entered by the user in the incomplete text and the limiter character entered by the user in at least one portion of the incomplete text.

Further, the complete text generator 440 is configured to automatically form the one or more complete text by adding the one or more remaining text to the incomplete text. After forming the one or more complete text, the display 150 displays one or more complete text.

Further, the alternate text predictor 450 is configured to detect the one or more auto-complete gesture performed to mark the text from the one or more complete text. Further, the alternate text predictor 450 is configured to detect the type of the at least one auto-complete gesture and predict the at least one alternate text corresponding to the marked text based on the type of at least one auto-complete gesture. After predicting the at least one alternate text corresponding to the marked text, the display 150 displays the at least one alternate text.

In an embodiment of the disclosure, the user provides the input on the display 150. The input is recognized in real time by the input recognizer 420. Further, based on the input of the auto-complete gesture, the remaining text determiner 430 gets triggered. Further, the partially written text and the auto-complete gesture are recognized and processed separately. The gesture length is dynamically mapped to number of characters depending upon length of the written text. Both outputs (i.e., partially written text along with the mapped gesture length) are sent to the complete text generator 440 with an inbuilt language model, the complete text generator 440 predicts the complete text based on the recognized prefix text and mapped suffix length.

As shown in the FIG. 3, in an example, the user provides the incomplete input (i.e., inter) on the display 150. The input is recognized in real time by the input recognizer 420. Further, based on the input of the auto-complete gesture followed by the incomplete input, the remaining text determiner 430 gets triggered. Further, the partially written text and the auto-complete gesture are recognized and processed independently. The partially written text feds into the complete text generator 440 to be recognized. The gesture length is dynamically mapped to number of characters depending upon the written text. Based on the recognized prefix text and the mapped suffix length, the complete text generator 440 predicts the complete text (e.g., interconnect, interchange, or the like).

Although the FIG. 4 shows various hardware components of the HWR engine 110 but it is to be understood that other embodiments are not limited thereon. In other embodiments of the disclosure, the HWR engine 110 may include less or more number of components. Further, the labels or names of the components are used only for illustrative purpose and does not limit the scope of the disclosure. One or more components can be combined together to perform same or substantially similar function to automatically provide the gesture-based auto-complete suggestions in the HWR engine 110.

Figure 5:
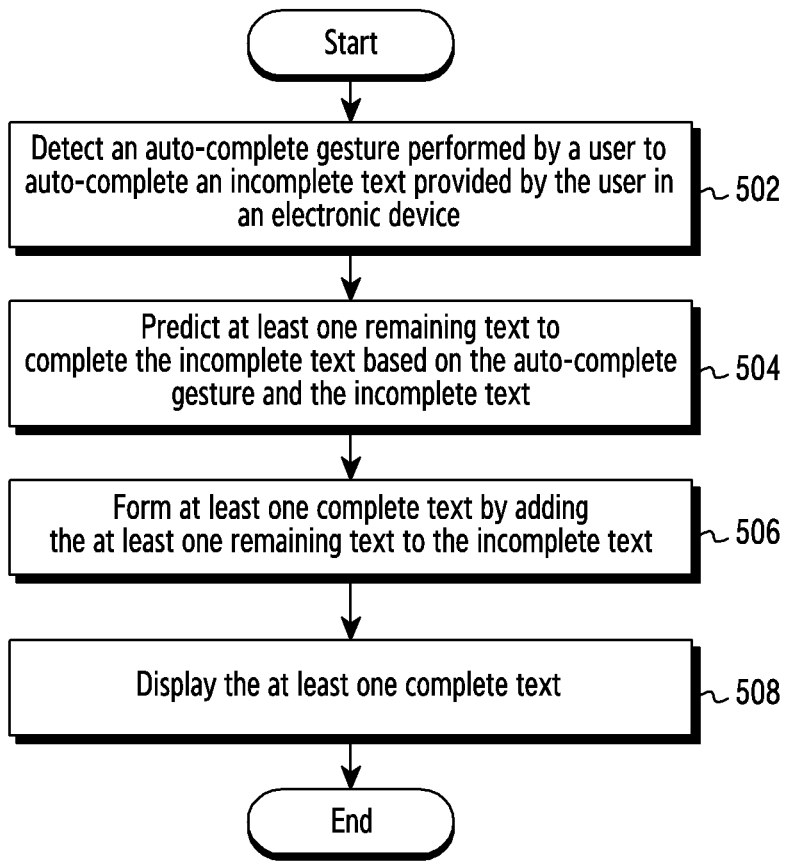
FIG. 5 is a flowchart illustrating a method for displaying one or more complete text based on one or more auto-complete gesture and the incomplete text, according to various embodiments of the disclosure.

FIG. 5 is a flowchart illustrating a method for displaying one or more complete text based on the one or more auto-complete gesture and the incomplete text according to various embodiments of the disclosure.

Referring to FIG. 5, at operation 502 the electronic device 100 detects the at least one auto-complete gesture performed by the user to auto-complete the incomplete text provided by the user. In an embodiment of the disclosure, the method allows the auto-complete gesture detector 410 to detect the at least one auto-complete gesture performed by the user to auto-complete the incomplete text provided by the user in the electronic device 100.

At operation 504, the electronic device 100 predicts the at least one remaining text to complete the incomplete text based on the at least one auto-complete gesture and the incomplete text. In an embodiment of the disclosure, the method allows the remaining text determiner 430 to dynamically predict the at least one remaining text to complete the incomplete text based on the at least one auto-complete gesture and the incomplete text.

At operation 506, the electronic device 100 forms the at least one complete text by adding the at least one remaining text to the incomplete text. In an embodiment of the disclosure, the method allows the complete text generator 440 to automatically form the at least one complete text by adding the at least one remaining text to the incomplete text.

At operation 508, the electronic device 100 displays the at least one complete text. In an embodiment of the disclosure, the method allows the display 150 to display the at least one complete text.

The various actions, acts, blocks, or the like in the flow diagram 500 may be performed in the order presented, in a different order or simultaneously. Further, in some embodiments of the disclosure, some of the actions, acts, blocks, or the like may be omitted, added, modified, skipped, or the like without departing from the scope of the disclosure.

Figure 6:
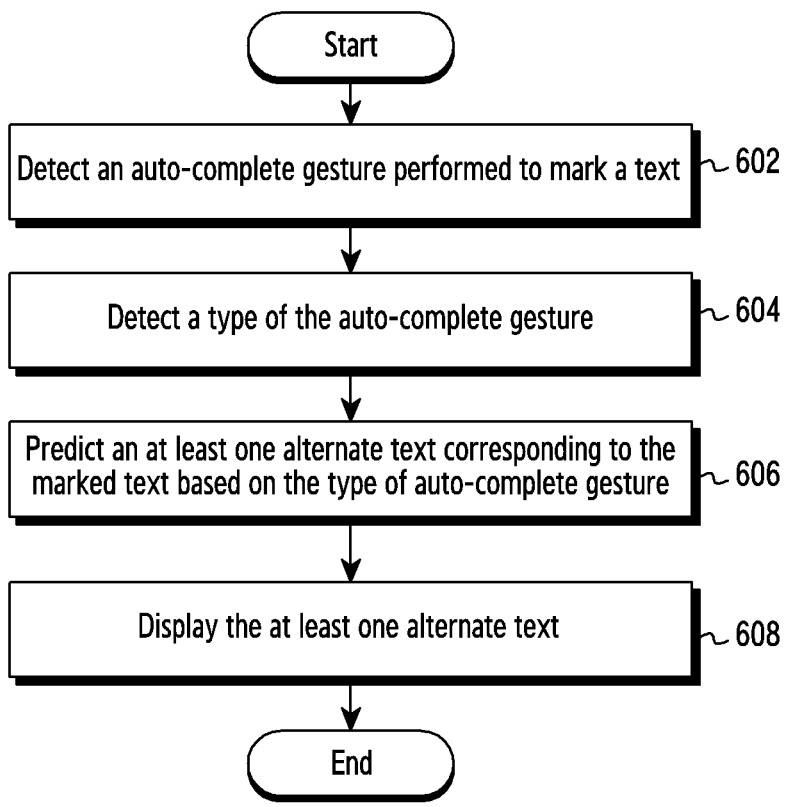
FIG. 6 is a flowchart illustrating a method for displaying one or more alternate text based on one or more auto-complete gesture and the complete text, according to various embodiments of the disclosure.

FIG. 6 is a flowchart illustrating a method for displaying one or more alternate text based on one or more auto-complete gesture and the complete text according to various embodiments of the disclosure.

Referring to FIG. 6, at operation 602 the electronic device 100 detects the at least one auto-complete gesture performed to mark the text. In an embodiment of the disclosure, the method allows the auto-complete gesture detector 410 to detect the at least one auto-complete gesture performed to mark the text.

At operation 604, the electronic device 100 detects the type of the at least one auto-complete gesture. In an embodiment of the disclosure, the method allows the auto-complete gesture detector 410 to detect the type of the at least one auto-complete gesture.

At operation 606, the electronic device 100 predicts the at least one alternate text corresponding to the marked text based on the type of at least one auto-complete gesture. In an embodiment of the disclosure, the method allows the alternate text predictor 450 to predict the at least one alternate text corresponding to the marked text based on the type of at least one auto-complete gesture.

At operation 608, the electronic device 100 displays the at least one alternate text. In an embodiment of the disclosure, the method allows the display 150 to display the at least one alternate text.

The various actions, acts, blocks, or the like in the flow diagram 600 may be performed in the order presented, in a different order or simultaneously. Further, in some embodiments of the disclosure, some of the actions, acts, blocks, or the like may be omitted, added, modified, skipped, or the like without departing from the scope of the disclosure.

Figure 7:
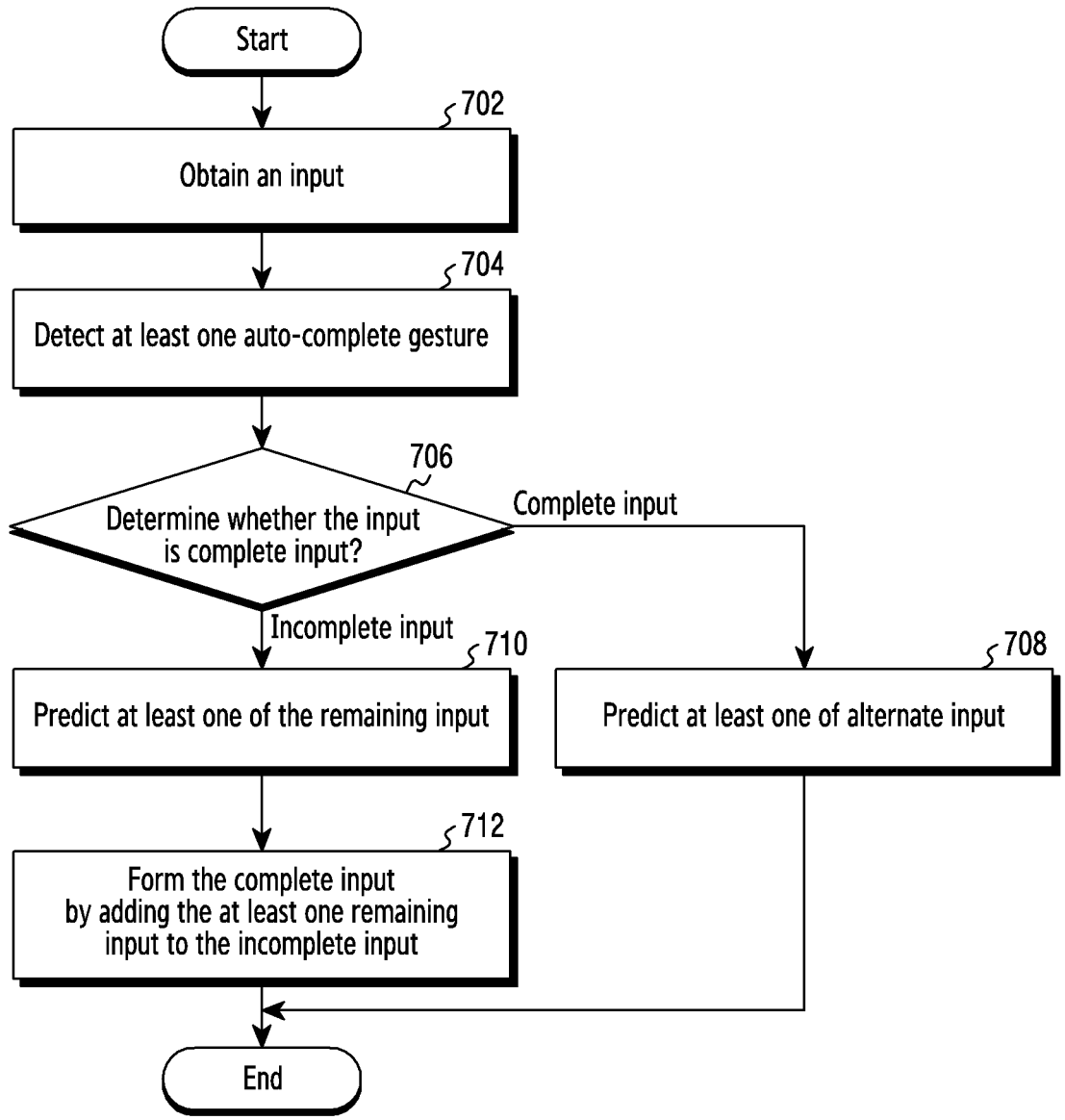
FIG. 7 is a flowchart illustrating a method for automatically providing gesture-based auto-complete suggestions, according to various embodiments of the disclosure.

FIG. 7 is a flowchart illustrating a method for automatically providing gesture-based auto-complete suggestions according to various embodiments of the disclosure.

Referring to FIG. 7, at operation 702 the electronic device 100 obtains the input. In an embodiment of the disclosure, the method allows the input recognizer 420 to obtain the input.

At operation 704, the electronic device 100 detects one or more auto-complete gesture. In an embodiment of the disclosure, the method allows the auto-complete gesture detector 410 to detect one or more auto-complete gesture.

At operation 706, the electronic device 100 determines whether the input is complete input or incomplete input. In an embodiment of the disclosure, the method allows the input recognizer 420 to determine whether the input is complete input or incomplete input.

If the input is the complete input then at, operation 708, the electronic device 100 predicts one or more alternate input. In an embodiment of the disclosure, the method allows the alternate text predictor 450 to dynamically predict one or more alternate input.

If the input is the incomplete input then, at operation 710, the electronic device 100 predicts at least one of the remaining input. In an embodiment of the disclosure, the method allows the remaining text determiner 430 to dynamically predict at least one of the remaining input.

At operation 712, the electronic device 100 forms the complete input by adding the at least one remaining input to the incomplete input. In an embodiment of the disclosure, the method allows the complete text generator 440 to automatically form the complete input by adding the at least one remaining input to the incomplete input.

The various actions, acts, blocks, or the like in the flow diagram 700 may be performed in the order presented, in a different order or simultaneously. Further, in some embodiments of the disclosure, some of the actions, acts, blocks, or the like may be omitted, added, modified, skipped, or the like without departing from the scope of the disclosure.

FIGS. 8A to 8D illustrate auto-completion words being displayed on an electronic device based on length of an auto-complete gesture according to various embodiments of the disclosure.

Referring to FIGS. 8A to 8D, if the user provides any prefix, the electronic device 100 displays the longest possible word in the current dictionary on the display 150 and a length of the longest possible word, so as to help the user with gesture stroke length decision. Further, the user can utilize that length to approximately decide how long the gesture needs to be. Further, the user can decide to go "back" if the user feels that the suggested words are longer than required, the electronic device 100 displays the word.

In an example, the user initially written "inter" and followed by the long auto-complete gesture. Based on the long auto-complete gesture and "inter", the HWR engine 110 displays "interchange" and "interconnect" as shown in the FIG. 8A. Further, the user feels that the suggested words are longer than required and the user minimizes the auto-complete gesture length, the HWR engine 110 displays the word (e.g., internal and interject) as shown in the FIG. 8B.

Figure 8C:
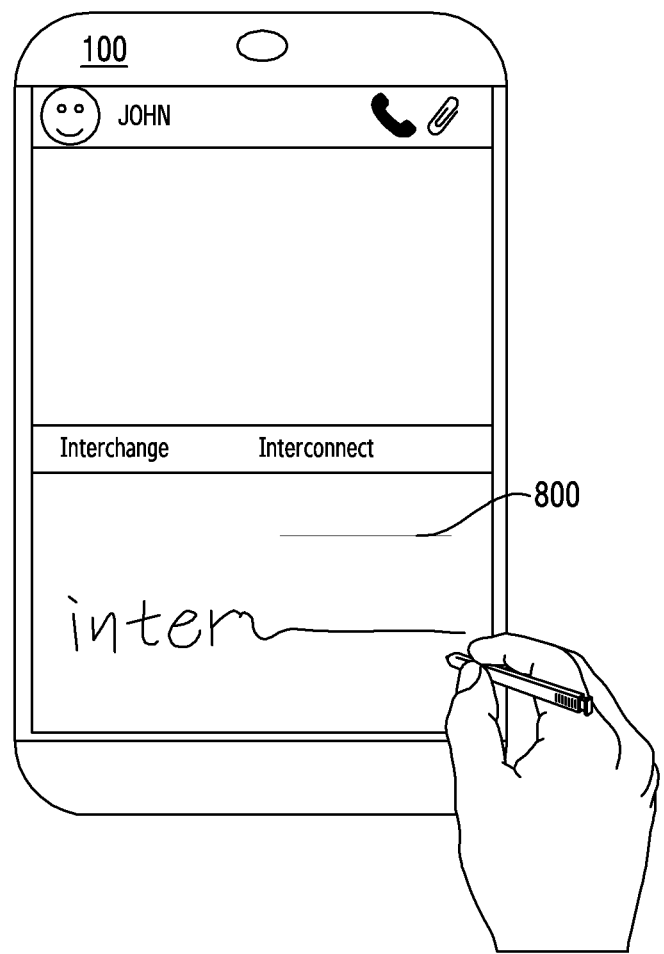
Figure 8D:
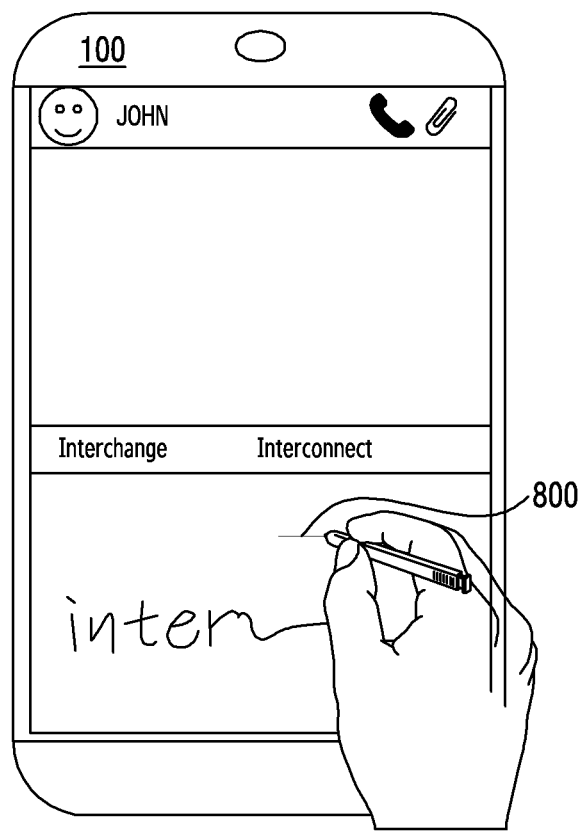

As shown in the FIGS. 8C and 8D, in another example, the user can choose to point and click on a guiding line 800 according to the length the user requires, instead of drawing the complete gesture. The guiding line 800 can be used to change the length as well, with another point and click.

FIGS. 9A and 9B illustrate auto-completion words being displayed on an electronic device when a user misses certain characters within a word while writing the word according to various embodiments of the disclosure.

Referring to FIGS. 9A and 9B, this feature is for the scenario when the user missed certain characters within the word while writing the word. Based on the proposed methods, the HWR engine 110 will utilize the available characters and their relative position to find the most suitable word from the dictionary. In an example, the user writes the sub-words "int", "nat" and "l", and provides the missing characters by providing the auto-complete gesture of required length. In that case, the HWR engine 110 dynamically predicts the complete text (e.g., intranational and international) based on the incomplete text and the auto-complete gesture.

FIGS. 10A, 10B 11A, and 11B illustrate a tense form of a word being displayed on an electronic device based on a direction of an auto-complete gesture according to various embodiments of the disclosure.

Referring to FIGS. 10A, 10B, 11A, and 11B, in an embodiment of the disclosure, the user can use the pre-defined auto-complete gesture (e.g., upward stroke for future tense, downward stroke for past tense, or the like) for completing the correct tense of the written verb.

Figure 10A:
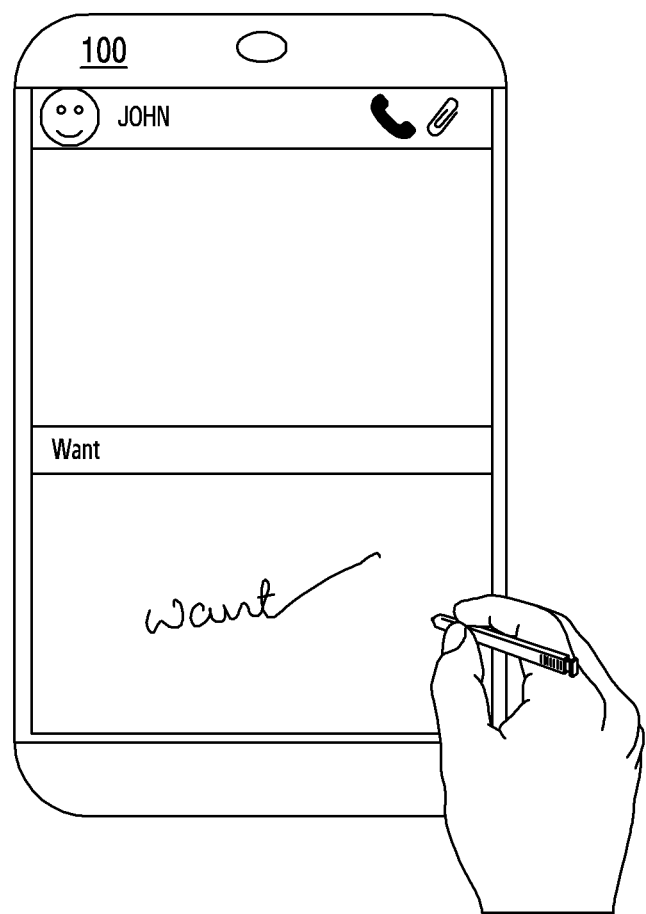
FIGS. 10A, 10B, 11A, and 11B illustrate a tense form of a word being displayed on an electronic device based on a direction of an auto-complete gesture according to various embodiments of the disclosure.
Figure 10B:
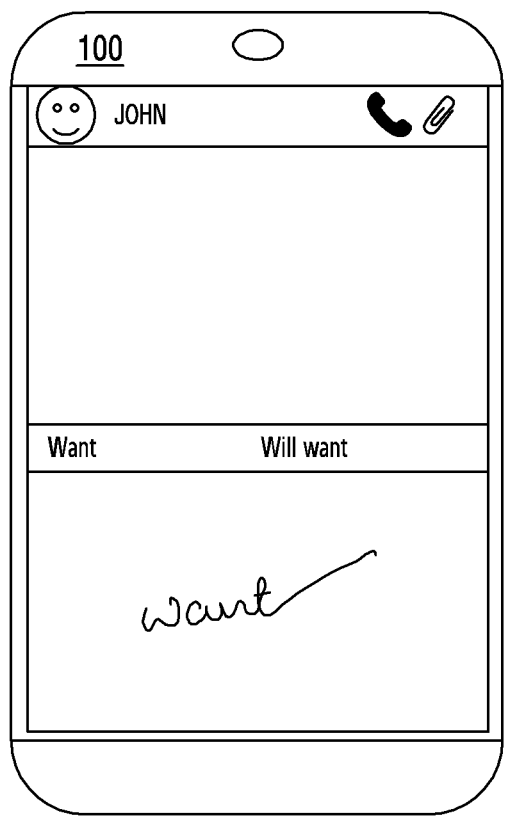
Figure 11A:
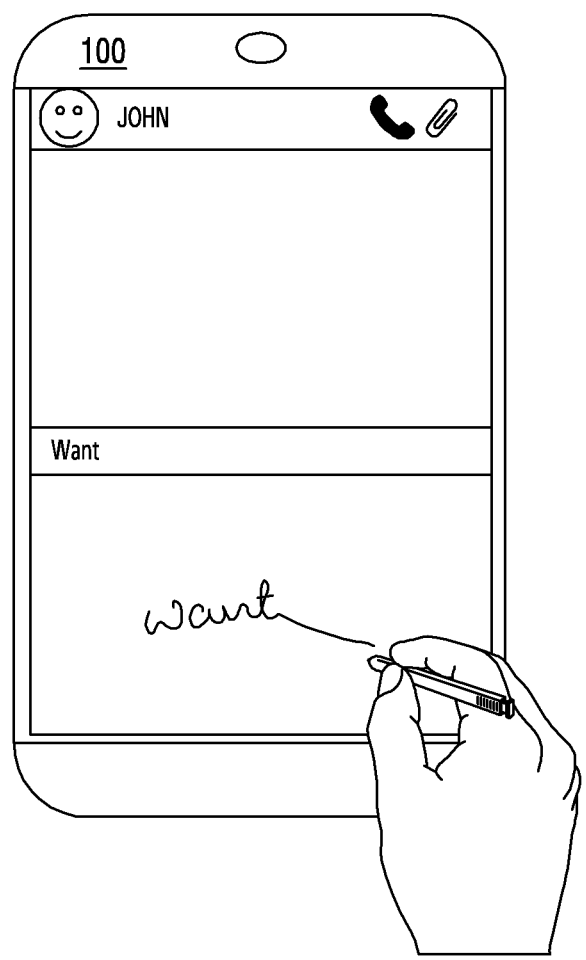
Figure 11B:
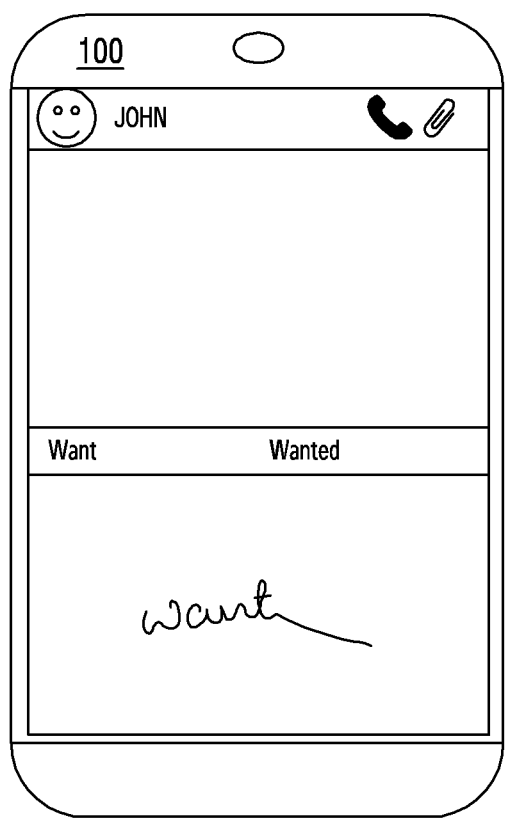

In an example, the user has written "want" followed by the upward stroke gesture then the HWR engine 110 will display the complete text (e.g., will want or the like) as shown in the FIG. 10A and FIG. 10B. In another example, the user has written "want" followed by the downward stroke gesture then the HWR engine 110 will display the complete text (e.g., wanted or the like) as shown in the FIG. 11A and FIG. 11B. An embodiment as shown in FIGS. 10A, 10B, 11A and 11B, a direction (i.e., the upward or the downward) of the stroke is detected and used to determine a tense. In another embodiment of the disclosure, the direction of the stroke is used to determine other characteristics of the word. For example, the direction of the stroke can be used to distinguish 'singular and plural', 'passive and active' and so on.

Figure 12A:
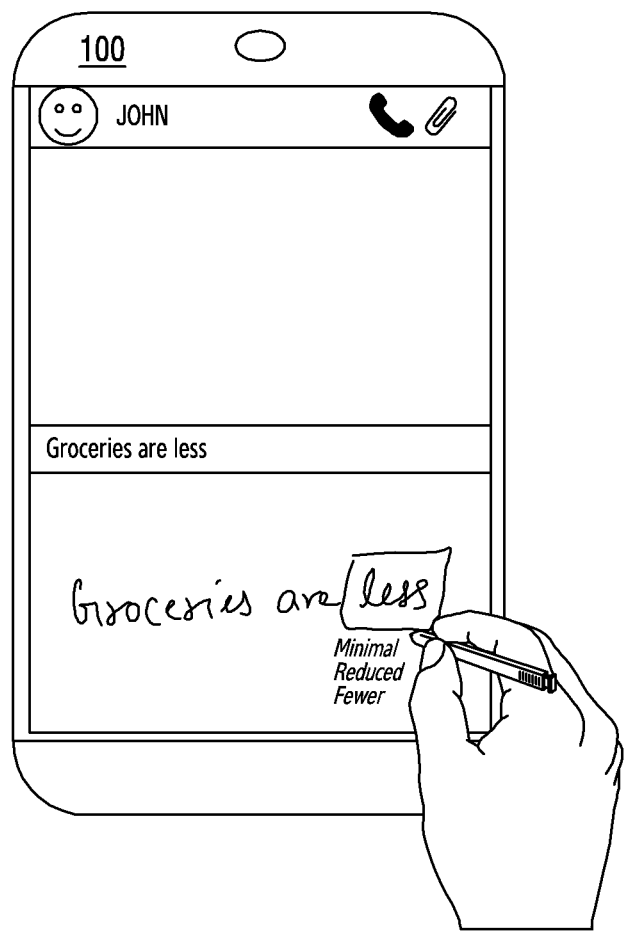
FIGS. 12A and 12B illustrate one or more alternate text corresponding to a marked text being predicted based on an auto-complete gesture according to various embodiments of the disclosure.
Figure 12B:
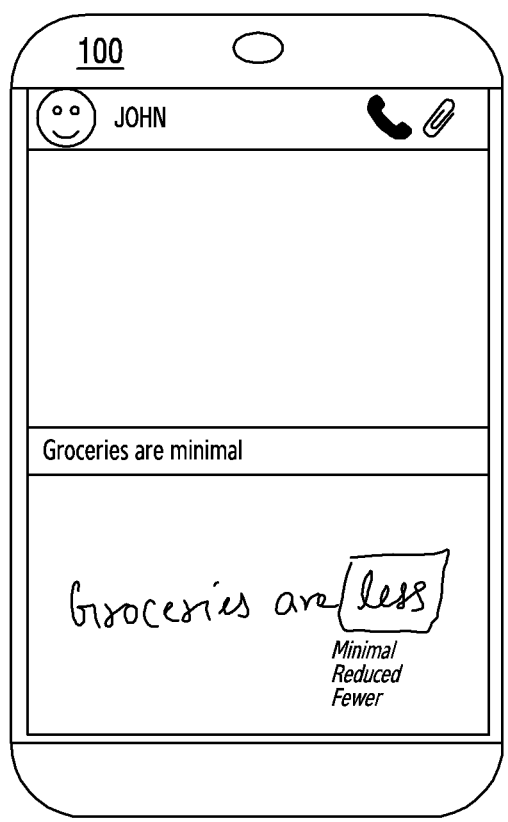

FIGS. 12A and 12B illustrate one or more alternate text corresponding to a marked text being predicted based on an auto-complete gesture according to various embodiments of the disclosure.

Referring to FIGS. 12A and 12B, the user can use the pre-defined gesture (e.g., box around the word) for finding synonyms of the marked word. As shown in the FIGS. 12A and 12B, the less is marked, so that synonyms for the less is minimal, limited and diminished.

FIGS. 13A and 13B illustrate completed word being displayed on an electronic device, where an auto-complete gesture and an incomplete text are provided over air, according to various embodiments of the disclosure.

Referring to FIGS. 13A and 13B, the user writes the required word/command over air using the specific sensor-based devices. The user can choose to leave the word incomplete and mark length of the missing characters using the autocomplete gesture. The written word would be detected, auto-completed and displayed to the user on the electronic device 100.

Figure 14A:
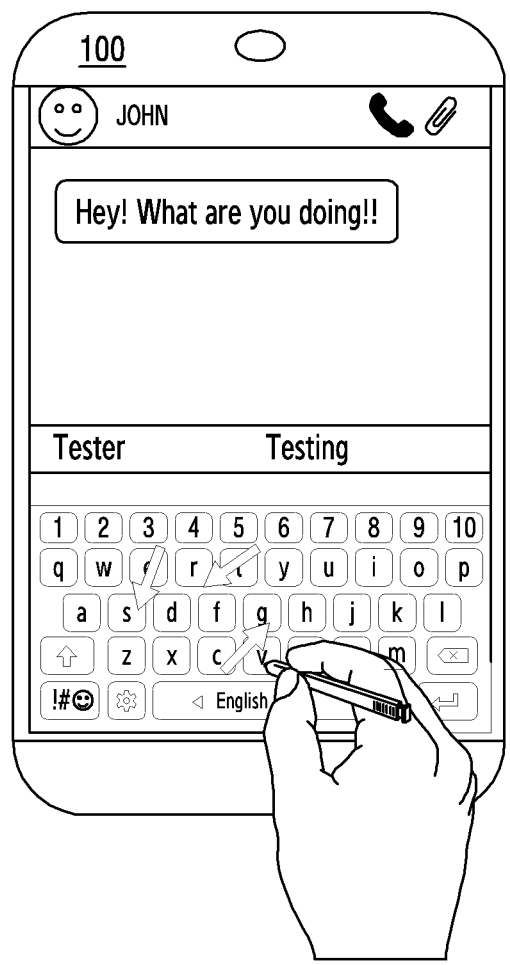
FIGS. 14A and 14B illustrate an auto-completion word being displayed on a virtual keyboard according to various embodiments of the disclosure.
Figure 14B:
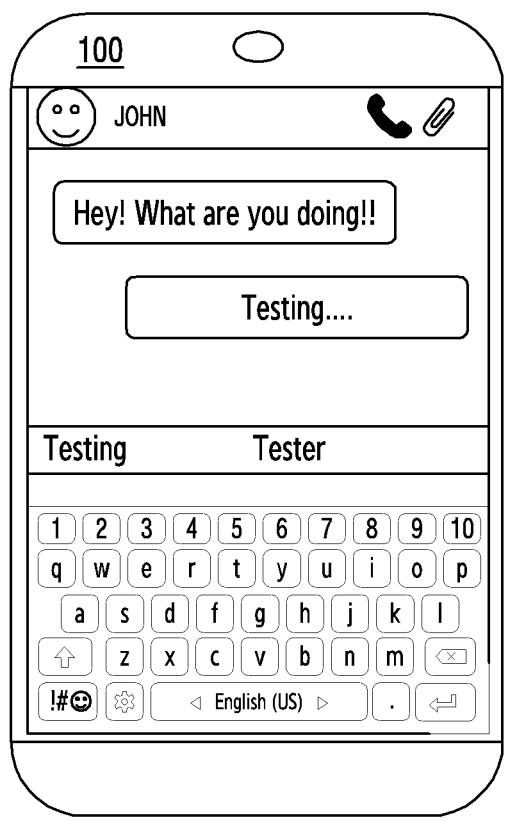

FIGS. 14A and 14B illustrate word predictions being displayed on a virtual keyboard according to various embodiments of the disclosure.

Referring to FIGS. 14A and 14B, the user swipes the partial and then lifts her finger to draw the completion gesture on a 'space' key. The gesture length can be mapped to the number of missing characters using the trace and time taken in drawing the gesture.

Figure 15:
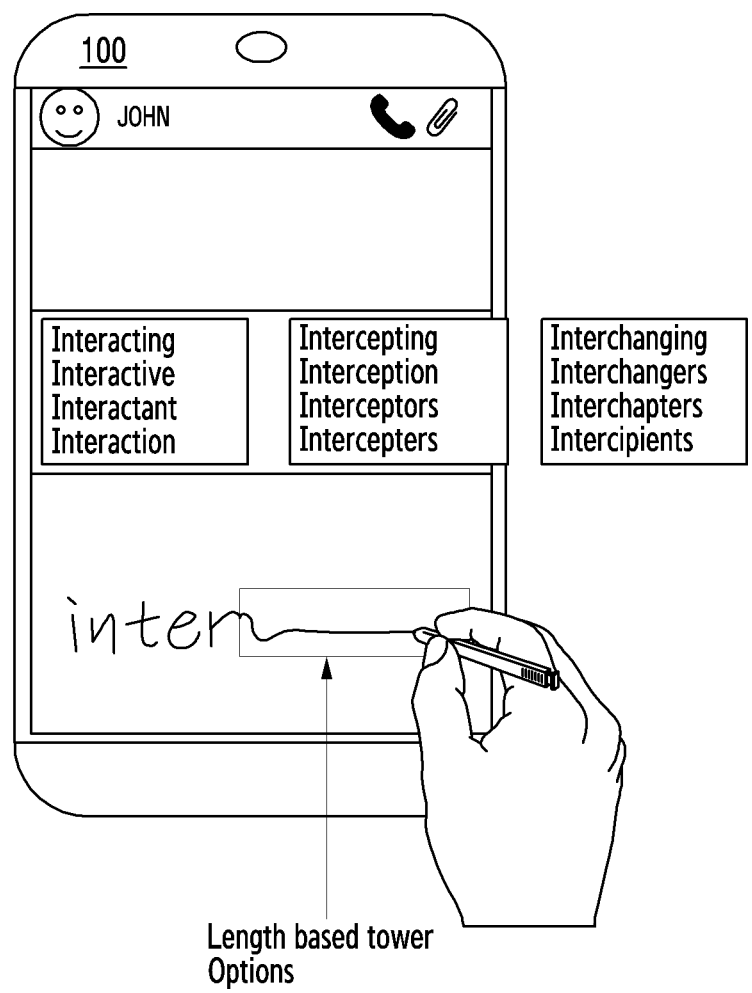
FIG. 15 illustrates an auto-completion word being displayed on an electronic device based on a length-based tower option according to various embodiments of the disclosure.

FIG. 15 illustrates an auto-completion word being displayed on an electronic device based on a length-based tower option according to various embodiments of the disclosure.

Referring to FIG. 15, the proposed method can be used to present all options in order of their length as separate 'towers'. Each 'tower' contains all possible auto-completion word of the specific length. This would make it easier for the user to find the required word. In an example, the words with suffix length 6 is shown in left portion of the FIG. 15, the words with suffix length 7 is shown in middle portion of the FIG. 15, and words with suffix length 8 is shown in right portion of the FIG. 15.

Figure 16A:
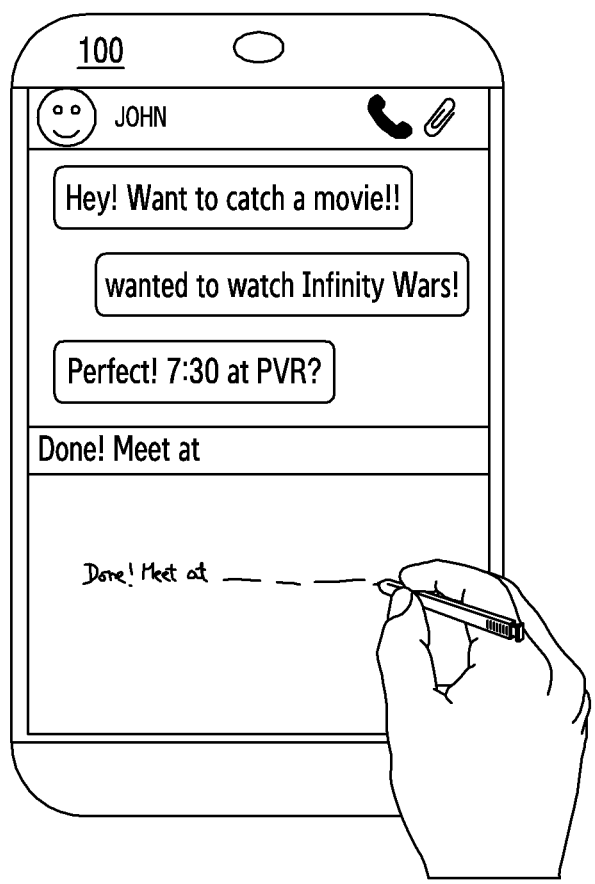
FIGS. 16A and 16B illustrate one or more words predicted to form a sentence based on an auto-complete gesture using a current conversations context and a past conversations context according to various embodiments of the disclosure.
Figure 16B:
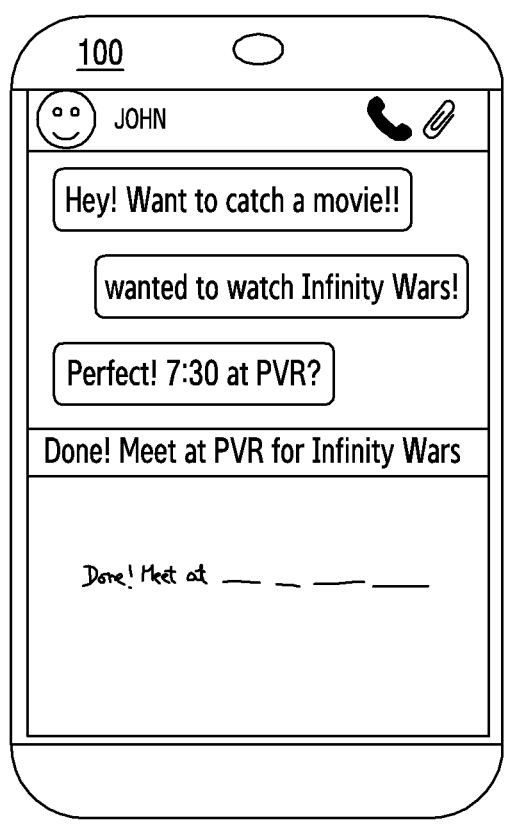

FIGS. 16A and 16B illustrate one or more words being predicted to form a sentence based on an auto-complete gesture using current and past conversations context according to various embodiments of the disclosure.

Referring to FIG. 16A, the user writes few words and provides gestures to predict the remaining words on the electronic device 100. Each word would be denoted by a separate gesture of length proportional to the word length. The sentence would be completed given the current context and the past conversations context. The complete sentence is displayed as shown in the FIG. 16B.

Figure 17A:
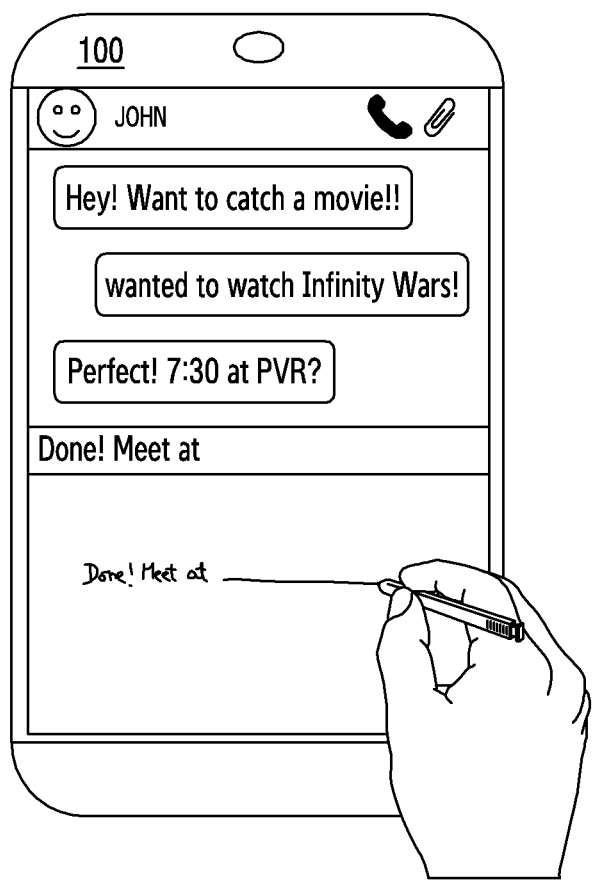
FIGS. 17A, 17B, and 17C illustrate one or more words predicted to form a sentence based on an auto-complete gesture using a current conversations context and a past conversations context according to various embodiments of the disclosure.
Figure 17B:
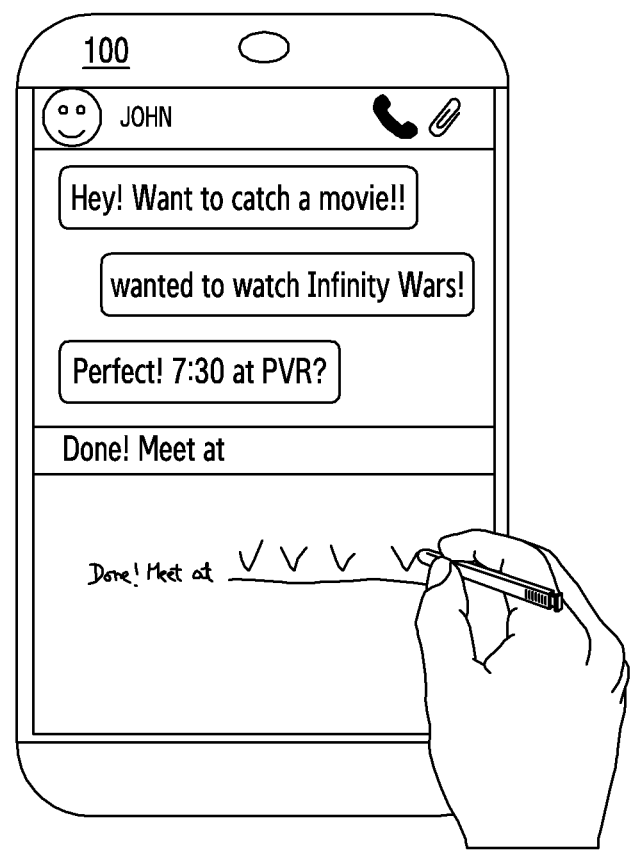
Figure 17C:
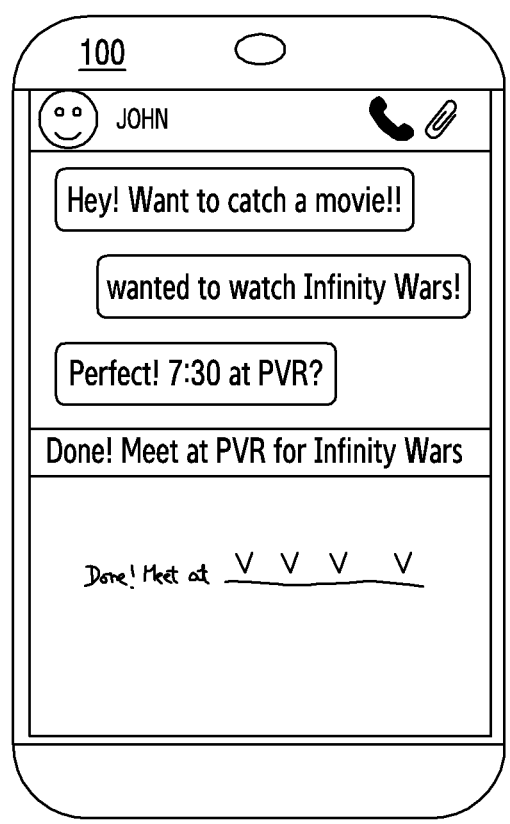

FIGS. 17A to 17C illustrate one or more words being predicted to form a sentence based on an auto-complete gesture using current and past conversations context according to various embodiments of the disclosure.

Referring to FIGS. 17A to 17C, the user writes few words and provides gestures to predict the remaining words on the electronic device 100. Unlike the example scenarios in FIGS. 16A and 16B, a set of words are denoted a single gesture, and indications for a blank letter or a spacing letter (e.g., √). The sentence would be completed given the current context and the past conversations context. The complete sentence is displayed as shown in the FIG. 17C.

Figure 18A:
FIGS. 18A and 18B illustrate one or more words predicted to form a sentence while taking notes according to various embodiments of the disclosure.
Figure 18B:
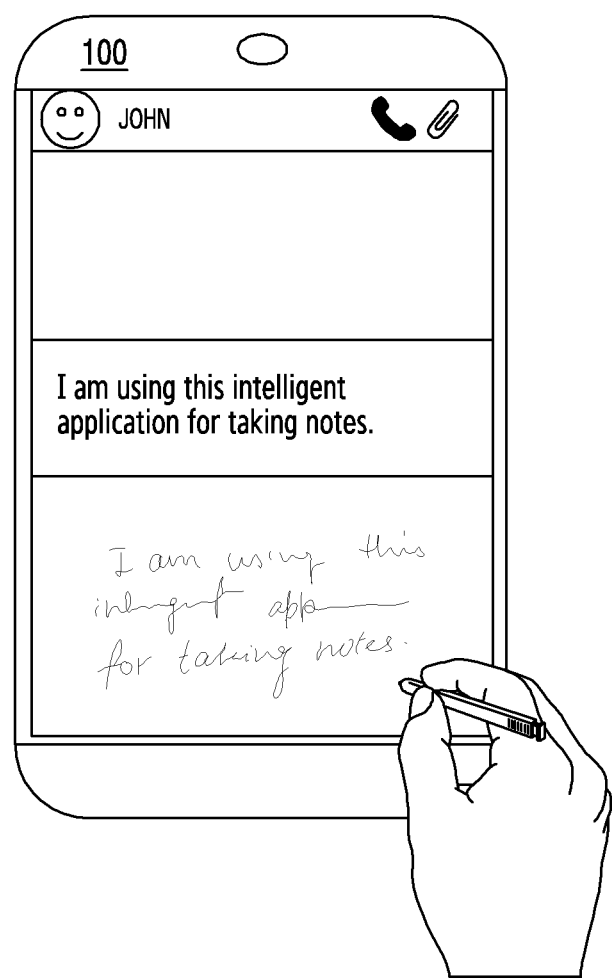

FIGS. 18A and 18B illustrate one or more words predicted to form the sentence while taking notes, according to various embodiments of the disclosure. The user utilizes a writing application to write notes as the user normally writes on the paper. The HWR engine 110 completes text automatically by dynamically predicting at least one remaining text to complete the incomplete text based on at least one auto-complete gesture and the incomplete text, so that the electronic device 100 enables extremely fast and accurate note-taking, modelling how users usually write using a pen and paper.

Figure 19A:
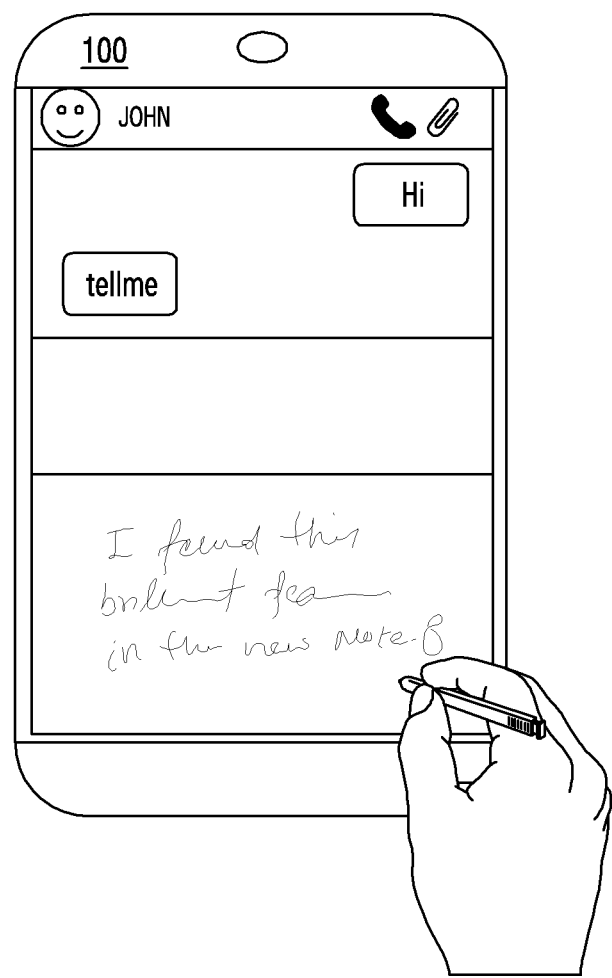
FIGS. 19B and 19B illustrate one or more words predicted to form a sentence while chatting according to various embodiments of the disclosure.
Figure 19B:
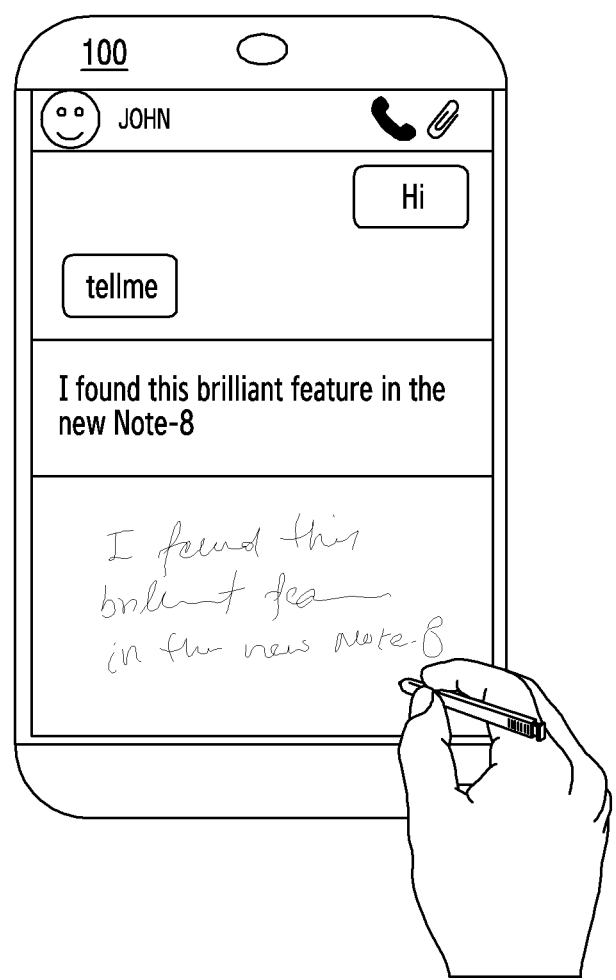

FIGS. 19A and 19B illustrate one or more words predicted to form a sentence while chatting according to various embodiments of the disclosure.

Referring to FIGS. 19A and 19B, the user uses the writing input field while chatting using a messaging application. Based on the proposed methods, the written text is recognized and completed by the HWR engine 110. Further, the user can then choose to send the message or make changes if needed.

Figure 20:
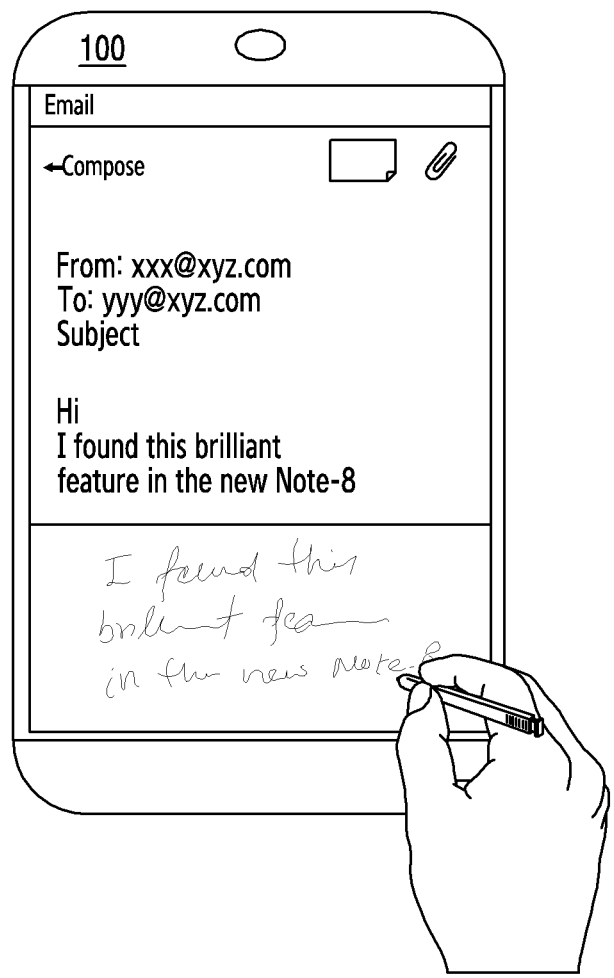
FIG. 20 illustrates one or more words predicted to form a sentence while composing an email according to various embodiments of the disclosure.

FIG. 20 illustrates one or more words predicted to form a sentence while composing an email according to various embodiments of the disclosure.

Referring to FIG. 20, the user uses the writing input field while composing emails on the messaging application. Based on the proposed methods, the written text is recognized and completed by the HWR engine 110. Further, suitable thesaurus options are shown when required, which the user can choose from. The final e-mail is created using the HWR engine 110 and is ready to be sent.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing gesture-based auto-complete suggestions in an electronic device, the method comprising:
   detecting at least one gesture performed by a user to complete an incomplete text provided by the user;
   determining a length of the at least one gesture;
   determining at least one remaining text to complete the incomplete text based on the length of the at least one gesture and the incomplete text, wherein the length of the at least one gesture corresponds to a number of characters to be determined in the at least one remaining text;
   forming at least one complete text by adding the at least one remaining text to an end of the incomplete text; and
   displaying the at least one complete text.

2. The method of claim 1, wherein the determining of the at least one remaining text to complete the incomplete text based on the length of the at least one gesture and the incomplete text comprises:
   determining at least one of a type of the at least one gesture;
   scanning the incomplete text entered by the user to detect at least one of a number of characters entered by the user in the incomplete text or a limiter character entered by the user in at least one portion of the incomplete text; and
   determining the at least one remaining text, based on the length of the at least one gesture and the at least one of the type of the at least one gesture and the at least one of the number of characters entered by the user in the incomplete text or the limiter character entered by the user in the at least one portion of the incomplete text.

3. The method of claim 2,
   wherein the type of the at least one gesture is used to identify a type of the at least one remaining text that needs to be determined, and
   wherein the type of the at least one remaining text includes one of a tense form of the at least one remaining text or a verb form of the at least one remaining text.

4. The method of claim 2, wherein the number of characters entered by the user in the incomplete text is used to identify a number of characters in the at least one remaining text.

5. The method of claim 2, wherein the limiter character entered by the user in at least one of the incomplete text indicates a sequence of one or more characters used to specify a boundary between portions in the at least one remaining text to be determined.

6. The method of claim 1, wherein the displaying of the at least one complete text comprises displaying the at least one complete text having a same number of characters grouped together.

7. The method of claim 1,
   wherein the incomplete text is provided without the user touching a display of the electronic device, and
   wherein the at least one gesture is provided without the user touching the display of the electronic device.

8. The method of claim 1, further comprising:
   detecting at least one other gesture performed to mark a text from the at least one complete text;
   detecting a type of the at least one other gesture;
   determining at least one alternate text corresponding to the marked text based on the type of the at least one other gesture; and
   displaying the at least one alternate text.

9. The method of claim 8, further comprising replacing the marked text with the at least one alternate text.

10. The method of claim 8, wherein the at least one alternate text is one of a synonym of the marked text, an antonym of the marked text, or a homonym of the marked text.

11. An electronic device for providing gesture-based complete suggestions, the electronic device comprising:
    a memory;
    a display; and
    at least one processor configured to:
      detect at least one gesture performed by a user to complete an incomplete text provided by the user in the electronic device,
      determine a length of the at least one gesture,
      determine at least one remaining text to complete the incomplete text based on the length of the at least one gesture and the incomplete text, wherein the length of the at least one gesture corresponds to a number of characters to be determined in the at least one remaining text,
      form at least one complete text by adding the at least one remaining text to an end of the incomplete text, and
      display the at least one complete text.

12. The electronic device of claim 11, wherein the at least one processor is further configured to:
    determine at least one of a type of the at least one gesture,
    scan the incomplete text entered by the user to detect at least one of a number of characters entered by the user in the incomplete text or a limiter character entered by the user in at least one portion of the incomplete text, and
    determine the at least one remaining text, based on the length of the at least one gesture and the at least one of the type of the at least one gesture and the at least one of the number of characters entered by the user in the incomplete text or the limiter character entered by the user in the at least one portion of the incomplete text.

13. The electronic device of claim 12,
    wherein the type of the at least one gesture is used to identify a type of the at least one remaining text that needs to be determined, and wherein the type of the at least one remaining text includes one of a tense form of the at least one remaining text or a verb form of the at least one remaining text.

14. The electronic device of claim 11, wherein the displaying of the at least one complete text comprises displaying the at least one complete text having a same number of characters grouped together.

15. The electronic device of claim 11,
wherein the incomplete text is provided without the user touching the display of the electronic device, and
wherein the at least one gesture is provided without the user touching the display of the electronic device.

16. The electronic device of claim 11, wherein the at least one processor is further configured to:
detect at least one other gesture performed to mark a text from the at least one complete text,
detect a type of the at least one other gesture,
determine at least one alternate text corresponding to the marked text based on the type of the at least one other gesture, and
display the at least one alternate text.

17. The electronic device of claim 16, wherein a handwriting (HWR) engine is configured to replace the marked text with the at least one alternate text.

18. The electronic device of claim 16, wherein the at least one alternate text is one of a synonym of the marked text, an antonym of the marked text, or a homonym of the marked text.

\* \* \* \* \*